United States Patent [19]
Märkl et al.

[11] Patent Number: 5,710,706
[45] Date of Patent: Jan. 20, 1998

[54] METHOD FOR ENTERING DATA INTO A SCALE

[75] Inventors: Katrin Märkl; Claus Freytag; Stephan Günther; Ralf Kubatzki; Wolfgang Thiel, all of Berlin, Germany

[73] Assignee: Francotyp-Postalia AG & Co., Birkenwerder, Germany

[21] Appl. No.: 579,059

[22] Filed: Dec. 26, 1995

[30] Foreign Application Priority Data

Dec. 23, 1994 [DE] Germany ............... 44 47 404.0

[51] Int. Cl.⁶ .................................................. G07B 17/00
[52] U.S. Cl. .............................. 364/464.19; 177/25.15; 235/375
[58] Field of Search .................. 177/25.15; 235/375; 364/464.02, 464.03, 466, 464.11, 464.19, 464.2

[56] References Cited

U.S. PATENT DOCUMENTS

| | | | |
|---|---|---|---|
| 3,635,297 | 1/1972 | Salava | 177/5 |
| 4,122,532 | 10/1978 | Dlugos et al. | 177/5 X |
| 4,138,735 | 2/1979 | Allocca et al. | 364/567 X |
| 4,285,325 | 8/1981 | Dlugos et al. | 364/464.12 |
| 4,308,579 | 12/1981 | Dlugos | 364/464.17 |
| 4,410,961 | 10/1983 | Dlugos et al. | 364/466 X |
| 4,462,473 | 7/1984 | Valestin | 177/25.15 |
| 4,466,079 | 8/1984 | Daniels et al. | 364/464.17 |
| 4,506,330 | 3/1985 | Dlugos | 364/466 |
| 4,583,195 | 4/1986 | Daniels et al. | 395/500 |
| 4,603,400 | 7/1986 | Daniels | 395/500 |
| 4,718,506 | 1/1988 | Hills | 177/25.15 |
| 4,742,878 | 5/1988 | Freeman et al. | 177/25.15 |
| 4,787,045 | 11/1988 | Storace et al. | 364/464.02 |
| 4,787,046 | 11/1988 | Feinland et al. | 364/464.17 |
| 4,802,218 | 1/1989 | Wright et al. | 380/23 |
| 4,900,904 | 2/1990 | Wright et al. | 235/381 |
| 4,956,782 | 9/1990 | Freeman et al. | 364/464.16 |
| 5,233,657 | 8/1993 | Gunther | 364/464.02 X |
| 5,471,925 | 12/1995 | Heinrich et al. | 101/91 |
| 5,490,077 | 2/1996 | Freytag | 364/464.02 |

FOREIGN PATENT DOCUMENTS

| | | |
|---|---|---|
| 0 619 565 | 9/1987 | European Pat. Off. |
| 0 328 059 | 2/1989 | European Pat. Off. |

*Primary Examiner*—Edward R. Cosimano
*Attorney, Agent, or Firm*—Hill, Steadman & Simpson

[57] ABSTRACT

In a method and an arrangement for entering data into a scale via a serial interface from the postage meter machine in order to load updating data into the scale via a connecting cable, a reception unit (modem) or a chip card read/write unit of the postage meter machine can be accessed in order to call data from external memory means. Automatic checking of the most recent status of data contents stored in the scale is undertaken on the basis of check data in the postage meter machine using previously stored information about the modification to be made in the future and about the associated validity effective date. Updating in then undertaken, whereby updating data are transmitted via the postage meter machine to the scale after the activation thereof or after a modification takes effect, the data being communicated from an external memory or a chip card or via a communication network from a remote data center.

32 Claims, 12 Drawing Sheets

| UPDATING DATA | NAME | VALIDITY DATA |

METHOD FOR ENTERING DATA INTO A SCALE

BACKGROUND OF THE INVENTION

1. Field of the Invention

The present invention is directed to a method and apparatus for entering data into a scale, and more specifically to a method and apparatus for entering data into a postal scale connected to a postage meter machine.

2. Description of the Prior Art

It is known to connect a scale to a postage meter machine via a serial interface in order to enter weight information or postage values into the postage meter machine. The postage meter machine is utilized for franking postal matter and can be equipped with a control unit, memory means, input means, a modem and with a chip card write/read unit or other reception means, input/output control means, display means and a printer.

German OS 32 04 906 discloses a scale containing a postage calculator. The postage values calculated in the scale are entered into the postage meter machine via a separate, external periphery device interface. It is standard given changes in postage rates to have a service technician instal the new postage fee values at the customer site in the form of a non-volatile memory module. In addition to substantial service cost, this known approach means that when new postage rates or other charges are to take effect as of a specified date, a postage rate table cannot be installed ahead of time, thereby risking the presence of out-of-date postal information in the scale unless servicing on the effective date can be ensured (which is not always able to be accomplished).

U.S. Pat. No. 4,506,330 discloses a removal of a printed circuit board with DIP switches at the address input of a PROM for the selective addressing of a memory sector. Postage differences within specific service classes can be economically calculated by calculating on the basis of postal zip code conversion tables, which have a reduced memory requirement compared to geographical information. Although the memory requirement for the customer data storing of postal zone tables is thereby substantially reduced, the DIP switches must be manually set.

A similar replaceable memory is disclosed in U.S. Pat. No. 3,635,297 for a mail processing device having automatic calculation of fee values. This memory is accessed via a parallel bus interface and contains a postage fee table from which the postage amount is calculated upon entry of the weight of a mailing, or further dispatch particulars. A disadvantage of this approach is the outlay that arises when the fee values in the table of the memory must be modified when a new rate scale takes effect. It is not assured that the user of the device will have the replacement of the memory undertaken in time for updating.

German OS 28 03 982 discloses the use of a remote crediting for updating the postage fee tables stored in the mail handling machines required when a new rate schedule takes effect. Remotely actuated from a central data station, the new rate schedule is simultaneously transmitted to a number of mail processing machines. Each mail processing machine contains a reception means with a modem and a memory drive circuit with which the corresponding memory locations-similar to the usual case given a system data processor—are addressed by a transmitted address word and are overwritten by a transmitted, allocated data word. Initiation of such a modification proceeds from the data center when the postal authorities modify the postal rate schedules, designations of the destination zones or the classification of postal fees. The overriding is monitored by the data center with a signal return line. An updating with the new rate schedule, however, assumes that the postage meter machines are activated at these points in time or can be constantly addressed by the data center.

An automatic postage scale disclosed in U.S. Pat. No. 4,138,735 has a rate PROM that can be equipped with a current postage fee table by radio or telephone. Such updating, however, occurs non-simultaneously due to the necessity of discretely addressing each postage meter machine with a recognition address. This approach requires monitoring the sequence of the individual messages in order to exercise control over the respective updating status that has been achieved. In addition to the recognition address and the revised informational segment containing the postage fee table, a revision date section must therefore also be sent. The latter serves as an ordering number for the version of the information segment just transmitted. Given coincidence of the stored and the transmitted revision data segment, the data content of the stored, corresponding revision data segment in the automatic postage scale is incremented. A disadvantage is that it requires high outlay to avoid having the memory of the postage meter machine being filled or overfilled with many unnecessary data. Moreover, it is complicated to assure that the call setup on the part of the data center is successful. Franking according to valid postage fee schedules with portable postage meter machines would require their constant readiness to receive, among other things, fee changes.

When the postage meter machine contains a postage calculator, weight information are entered by the scale. A method for data entry into a postage meter machine for such a system is disclosed in European Application 566 225, employing chip cards or a cellular communication network. Known chip cards that have a number of non-volatile memories or separately accessible memory areas are successively plugged into a write/read unit connected to a microprocessor in order to serially transmit data representing different information into the postage meter machine. These data stored in the postage meter machine can then be accessed during operation thereof.

The problem of non-simultaneous transmission of tabular data (which is not limited only to postal rate data) is solved in the apparatus of European Application 566 255 by providing the postage meter machine with first means for loading at least one table from a transmission means via reception means into a predetermined memory space of a memory means of the postage meter machine. Tabular data or information stored in tables in the transmission means, particularly in at least one chip card, and can be called contingent on certain conditions. At the time the postage meter machine is initialized, the aforementioned first means load those tabular data from the aforementioned transmission means that meet the conditions entered into the postage meter machine (at least two conditions must be specified, such as dispatching country and date, name and dispatching country or name and date) into the predetermined memory space of a memory in the postage meter machine. The postage meter machine also has second means in the control module for selecting the current table in force and/or information that are available for the functioning of the postage meter machine on the basis of further conditions (time of day, password and/or other identifiers), whereby the further conditions can be entered via third means. These aforementioned third means includes at least a memory, display and input means as well as a clock module.

Among the advantages of this solution is that the postage meter machine uses its first means to compare the conditions present in the postage meter machine to conditions present in the chip card or in the memory of the mobile radio telephone network after activation, or during the initialization, of the postage meter machine in order to load allocated tables. There is thus no possibility of old data erroneously being used because a postage meter machine was not capable of receiving the new data from the central because it was turned off at the point in time of the transmission or because the transmission was disturbed. A further advantage is the completely automatically sequencing, decentrally initiated reloading that relieve the user and the data center of the burden of initiating and conducting reloading.

This known postage meter machine is thus not addressed from any central location for revising the table; rather, the central transfers the data to a decentralized memory of the transmission means. From there, the data are called by each postage meter machine at various points in time but still before the official change of the fee schedule. The postage meter machine therefore has a second means in its control module for selecting from the central offering corresponding to the aforementioned conditions.

The advantage of this solution is thus the elimination of the calling a postage meter machine and the addressing thereof by the data center or by a transmitter. The call setup thus ensues decentrally, proceeding from each postage meter machine to the memory in the aforementioned transmission means. Of course, it can be assumed for the data center that the data prescribed by the central memory are not falsified. Each table is thus fundamentally available for each postage meter machine. Storage of an address of each postage meter machine is therefore not required in the transmission means.

Third means form selection means for the table in this known postage meter machine, the clock/date module and the input means for date and dispatching country being included. These are located in the postage meter machine and generate the conditions in conjunction with the use thereof. When the postage meter machine is then switched on and when at least the aforementioned, two conditions (dispatching country and date, name and date or dispatching country and name) are present, a transmission of the tabular data ensues after the standard initialization. Advantageously, the transmission of further tabular data is also enabled by additionally entered, further conditions such as the time of day and/or an identifier (name or password).

It is also advantageous that the way in which this known postage meter machine is used has no influence on what data fill its memory. The tabular data which are present in stored form in the machine are thus defined by the use of the postage meter machine. Time is, in fact, needed at the beginning to transmit the tabular data. The necessity to store all data in the postage meter machine from the very outset, however, is eliminated since at least a part of the data can be subsequently transmitted.

A disadvantage of this known approach is that it cannot simply be transferred to a system in which the postage meter machine does not contain a postage calculator but wherein the scale contains a postage calculator and the calculated postage values are entered into the postage meter machine by the scale. To this end, the mail processing system would have to be equipped with a further reception means or chip card write/read unit, so that the memory content of the scale can be correspondingly updated. For data entry by differently authorized users and for avoiding the difficulties due to the limited memory space on a chip card, it has been proposed to employ a plurality of chip cards simultaneously plugged into respective write/read units.

U.S. Pat. No. 4,802,218 discloses an automatic transmission system having a plurality of slots for chip cards. In addition to a chip card for reloading credit and accounting purposes, whereby the postage fee value to be printed is subtracted from the credit, a further chip card (a rate chip card) is also employed for a postage fee table. The aforementioned postage fee value is identified with the assistance of this rate chip card. The rate chip card, however, must be constantly accessed: calculating time is thus used for the communication with the write/read units and, conditioned by the serial interface, the data flow is lower than, for example, given a parallel interface. The device also becomes too large and too expensive due to the presence of a plurality of write/read units.

SUMMARY OF THE INVENTION

It is an object of the present invention to provide a method and apparatus for undertaking data entry into a scale in uncomplicated fashion for a plurality of users.

It is also an object of the present invention to provide a method for entering current data into a scale that is based on a broad use of the chip cards or of some other communication means and that can be economically implemented. A further object is to satisfy the demand for updating the postage rate table stored in the scale at the right time.

It is a further object to create a mail processing system that includes a scale and a postage meter machine which can be optionally or alternatively supplied with updating data from a data center via a communication connection, whereby the call setup for the purpose of communication ensues decentrally proceeding from the mail processing system.

The above objects are achieved in a method and apparatus in accordance with the principles of the present invention wherein the existing, serial interface to the postage meter machine is used for updating the postage rate table, even in mailing systems having a scale without a modem connection or reception means for a mobile or telephone network.

In a preferred version, a corresponding set of chip cards carrying respectively different data can be made available to the user and can be used for a sequential data input, whereby updating data are transmitted via a write/read unit of the postage meter machine and via a serial interface to the scale and are stored in non-volatile fashion in a memory of the scale. It is sufficient to make use of the sole chip card write/read unit already present in the postage meter machine when updating data must be loaded, or for the loading of a new table with updating data, particularly new postage rate table. Alternatively, it is possible to load updating data into the mail processing system by means of remote data transmission, preferably via modem, whereby the initiative again proceeds decentrally from the aforementioned mailing system at the customer site.

The invention also permits planning an early preparation of postage rate tables which contain a scheduled modification of the postage rate values, so that these can be made accessible to all postal customers before the change officially takes effect. It is important to equip the majority of users with a current postage rate table ahead of the official effective date instead of attempting to do so simultaneously, as was heretofore tried. Each user of the mail processing system receives a message from the data center regarding what portion of the relevant data contents shall be initially modified and is thus in the position to implement the corresponding data updating when the updating data have become valid.

A first data transmission initially ensues from the scale to the postage meter machine in order to transmit the check data from the postage rate table stored in the connected scale to the postage meter machine, and a validity check of the scale data or of the postage rate table is undertaken in the postage meter machine on the basis of the check data, this validity check being monitored by the data center at time intervals. In the internal validity check of the postage meter machine, the date or the time the data take effect is taken into consideration for check data of the data stored in the scale as well as for the information relating to future, current scale data. Preferably, the corresponding conditions for the selection of the tabular data to be loaded are essentially the name of the table segment to be modified in future and the date the aforementioned table segment takes effect. Since not all parts of the conversion table are required when the mail processing system remains at the same location, a further limitation of the selection can be undertaken dependent on location. Likewise, a part of the aforementioned name can include a location-dependent reference in order to facilitate the selection.

When the validity check shows that a loading of a new table or new parts of a table, is required for updating the data stored in the memory of the scale, a second data transmission ensues from the memory of the transmission means to the postage meter machine in which a tabular data packet, or parts thereof, are initially intermediately stored and are then transmitted to the scale.

It is unavoidable that not as much data as may perhaps be desirable can be currently stored in a single chip card. Given increased data processing outlay, however, it would be possible to store only such data reduced to the necessary data set in compressed form in a chip card.

Under the control of the postage meter machine, the tabular data packets are first completely transmitted from the transmission means to the postage meter machine in a first version and are stored therein, and are only then communicated to the scale. In a second version, each tabular data packet is immediately transmitted into the corresponding memory of the scale and is stored therein.

Only control data for the transmission to the scale are stored in the postage meter machine in the aforementioned second version. At the end of the transmission, a corresponding signal is generated by the postage meter machine and communicated to the scale which switches to normal operation after sending a corresponding handshake signal (ACK signal) and after a decompression of the data for storage or when the transmission has been ended. The scale includes a postage calculator for supplying the postage meter machine with corresponding postage values, and that the postage meter machine has a printer, preferably for digital printing. After the receipt of the ACK message transmitted by the scale in the postage meter machine, and when no further data are to be read from the transmission means, the postage meter machine is likewise switched into normal operation, or into the standby mode when no postal matter is to be franked with a postage value.

The invention also makes use of the method and apparatus of European Application 566 255 by virtue of the operating system of the postage meter machine—in conjunction with a communication and operating system of the card—accessing the memory of the chip card and reading its contents when one of the users of the postage meter machine plugs his or her personal chip card into the chip card write/read unit.

Proceeding on the basis of the fact that the user can employ a plurality of specific chip cards for the intended scale or postage meter machine function, in accordance with the method of the invention, the chip card need not remain in the machine for the implementation of operations.

The invention additionally permits the use of a chip card sent to the user for a location input and location-dependent modification of the place name in the postmark or advertising slogan. The loading of the aforementioned, location-dependent modification is preceded by a change in location with corresponding log-off and log-on of the location and the transmission of an authorization, or the sending of a corresponding chip card to the postage meter machine. The corresponding data are non-volatily stored in a memory of the postage meter machine in a manner comparable to the other communicated, setting data.

In the case of a portable, moveable mail processing system, as is required if the user who leases such a system moves frequently, there is a possible need to be able to initialize the scale for locally different, current tariffs, even for newly added mail carriers. According to the on-demand principle, updating data are reloaded into the scale of the mail processing system in order to assure a postage calculation according to current rate schedules. When the loading of a new postage rate table is required, a modem of the postage meter machine can be advantageously used for remote data transmission, other updating data also being capable of being loaded into the mail processing system therewith.

In the normal mode, the scale is operated as master and a postage meter machine is operated as slave, whereby the postage meter machine receives the calculated postage fee. Inventively, an automatic check of the data contents stored in the scale by the postage meter machine ensues in order to undertake a mode switching as required. After the mode switching, the scale is operated as slave in order to reload updating data.

A scale to be activated waits for a duration limited interval for a message from the postage meter machine for mode switching, whereby the scale is switched into the slave condition when the postage meter machine recognizes an updating requirement. After an uneventful elapse of the aforementioned interval, the scale remains in the master condition (normal mode).

Beginning with the recognition of an updating requirement, the postage meter machine operates as master until the updating has been concluded. Otherwise, i.e. without an updating requirement, the postage meter machine remains in the slave condition (normal mode).

A location-specific offering of data for the scale from an external memory via a communication network is preceded by an input of the postal zip code into the scale. In one version, wherein only an input of the location can be undertaken, for example with a scale keyboard instead of by remote data transmission, an input can be made after the turn-on in the initialization of the scale which, for example, is activated by a new user after a change in location. A further step of the aforementioned initialization allows a set of selected mail carriers to be defined, for example with the scale keyboard. The aforementioned set includes at least one mail carrier possible for the location, and for whom the postage rate table corresponding to the current schedule is loaded as soon as the postage meter machine has recognized an updating requirement. The data center supplies a list of mail carriers—to whom a code is assigned—regularly or at predetermined points in time. Upon input of the allocation code in the aforementioned step for defining a set of mail carriers following the step for location input and after transmission of the check data, the check again ensues in the postage meter machine that identifies an updating requirement and controls the updating. Image component data are thereby loaded into the postage meter machine in order to modify at least the place name and the postal zip code in the postmark corresponding to the change in location. The data center has a data bank in which aforementioned postal zip codes (zip to zone) are stored allocated to critical parts of the franking format. A standard logo of the mail carrier can thus be correspondingly modified (for example, according to the method disclosed in U.S. Pat. No. 5,233,657).

An automatic input can be made in a version of the invention with remote data transmission, for example with a modem, and communication of the location from the local exchange. After the activation in the initialization of the scale, a communication requirement is formed which is communicated to the postage meter machine. Controlled by the postage meter machine, an editing of data for the scale and for the postage meter machine automatically ensues after turn-on.

The location-specific offering of data ensues with a card-shaped transmission means or with an external memory on the basis of a communication network (modem, mobile radio telephone). Modern telephone and mobile radio telephone services allow a definition of location to be undertaken on short notice by the data center.

The call number of the calling terminal is transmitted to the called data center and is evaluated therein. The data center has a data bank in which the aforementioned call number parts (place identifiers) are stored allocated to critical parts of the franking format. The data bank of the data center registers an allocation of machine number, location and loaded handler constellation for each postage meter machine, and there is the possibility to change the prior location name or the prior handler constellation by entering the location or by defining a new set of mail carriers. If the minimum validity duration for the schedules stored in the scale is exceeded and a different set of mail carriers was defined, the data center is automatically dialed.

The inventive solution thus allows a change in location to be unproblematically undertaken without requiring the sending of a module for new postage rate table memories or without making it necessary for a service technician to arrive on site. Considerable costs of re-equipping, particularly of leased systems, are thus advantageously saved.

Advantageously, the input means (chip card, telephone connection) which are present in the postage meter machine are also utilized for the scale. An advantage of the inventive solution is in the mobility for an entire mail processing system including a postage-calculating scale, whereby the change in location can be registered in the data center.

The portable postage meter machine/scale arrangement recognizes the changing conditions and enters into a communication connection with an external memory either on its own initiative or after a corresponding input and automatic recognition of an updating requirement. The postage meter machine then controls the data transmission to the scale. For further mail carriers (such as Trans-O-Flex, UPS and/or other carriers) in addition the Deutsche Post AG in Germany or for the USPS in the USA, a solution is advantageously created of loading the location, a corresponding logo for the respective carrier, and the valid rate schedule of the respective carrier into the system without having to intervene in the system either mechanically or with a service technician.

DESCRIPTION OF THE PREFERRED EMBODIMENTS

Figure 1:
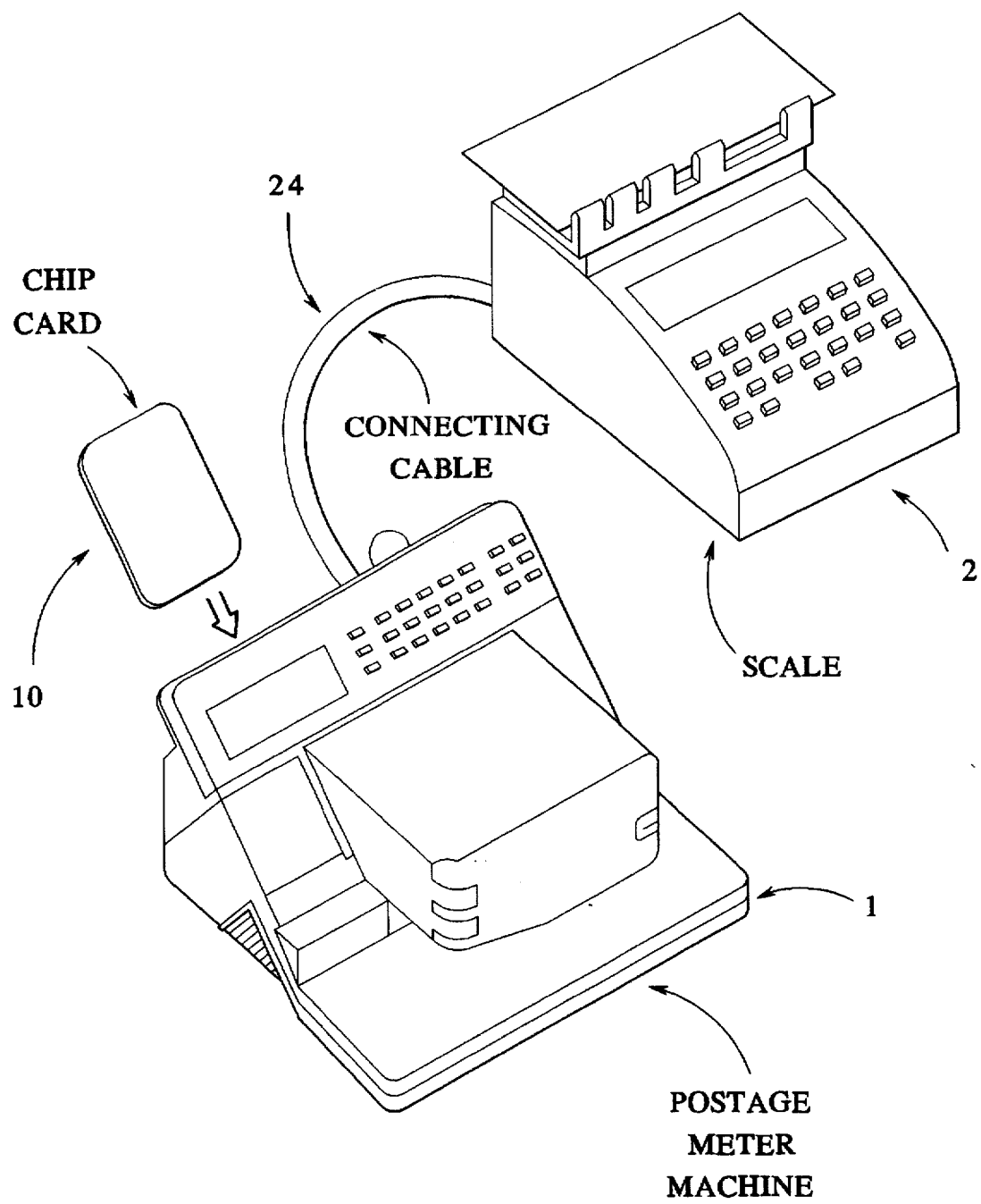
FIG. 1 shows a mail processing system having a postage meter machine equipped with a chip card write/read unit and a scale in which the inventive apparatus and method can be used.

The mail processing system shown in FIG. 1 comprises a serial interface connecting cable 24 from a postage meter machine 1 to a scale 2. The postage meter machine 1 is equipped with a modem terminal or with a telephone connection given an internal modem, with a chip card write/read unit and with a serial interface RS-232, preferably on the rear of the housing.

Figure 2:
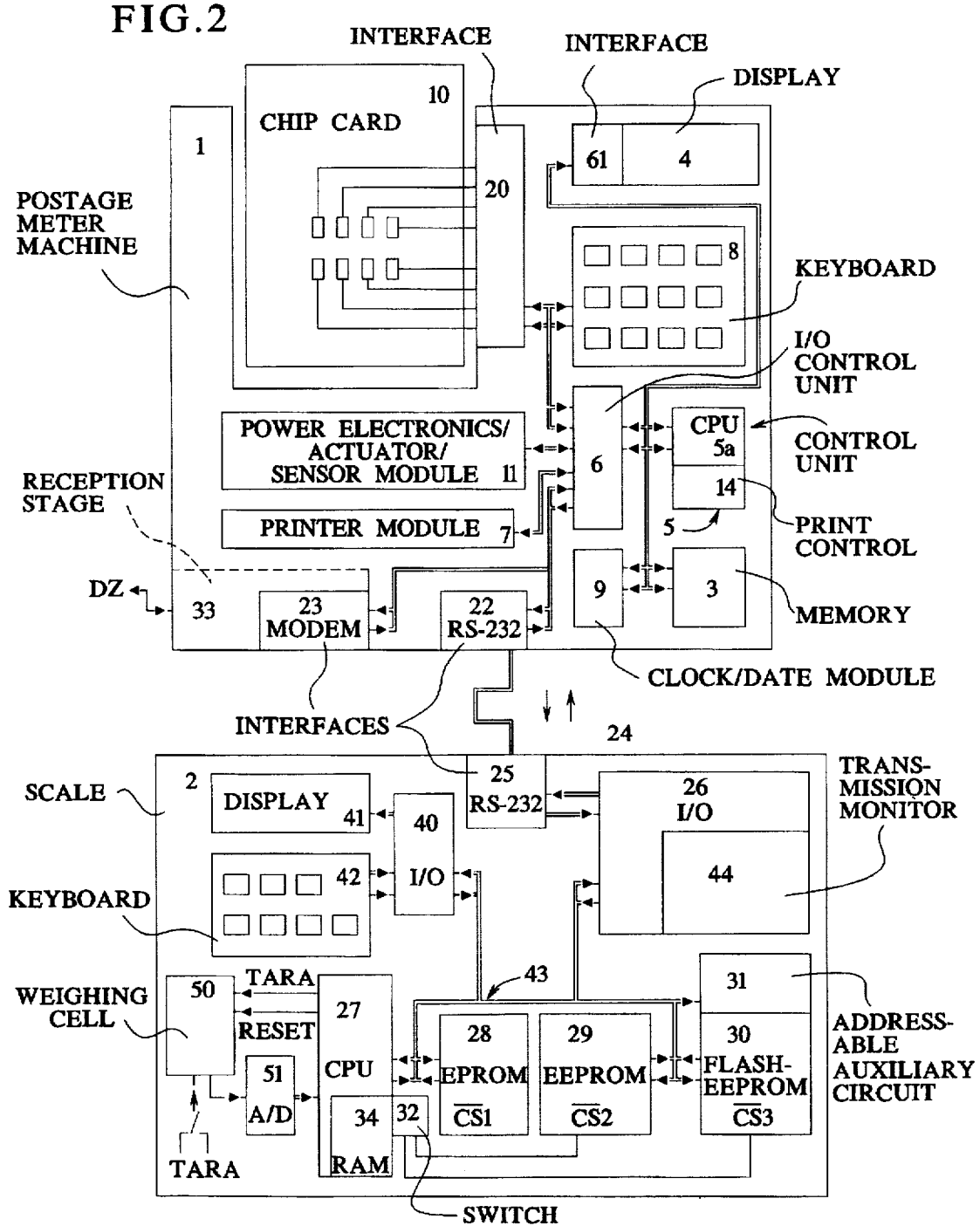
FIG. 2 is a block circuit diagram of a postage meter machine and of a scale in accordance with the principles of the invention.

The basic structure of the postage meter machine 1 and of the scale 2 that allow the inventive method to be implemented are explained in FIG. 2 on the basis of a block circuit diagram.

In the housing of the postage meter machine 1, and input and output interfaces 4 (a display), 8 (a keyboard), 20 (a card write/read unit), 22 and 23 are connected via an input/output control unit 6 to a processor system a either directly or via a bus. The display 4 is connected to this bus via an interface 61. The processor system includes a processing and/or memory region which is security-protected in a manner designed to frustrate unauthorized flankings and is composed of at least one memory 3, a clock/date module 9, a control unit 5 containing a print controller 14 and a processing unit (CPU) 5a, and special circuits (not shown, and described in more detail below) which are preferably a component of a battery-supported (non-volatile) memory (CMOS-NV-RAM) in the clock/date module 9 and/or a component of a non-volatile memory (EEPROM) in the memory 3.

The memory 3 is composed of a plurality of permanent and temporary, non-volatile memories in a known manner. Together with the CPU 5, a part of the memory 3 forms a protected postal area within the processor system. A permanent memory of the memory 3 of the postage meter machine 1 contains programs for a communication via interfaces 20, 22, 23 with the external input sources. These external input sources can be a chip card 10, the scale 2, and a telephone line connection to a remote data center DZ. (Various types of chip cards are discussed below; the chip card 10 is representative of each of these types.)

The base of the postage meter machine is composed of a printer module 7 and a power electronics/actuator/sensor module 11 that contains an energy supply and control for the drives (paper transport, printer, ribbon, tape generator). Further peripheral input/output means (not shown) can also be connected to the processor system, coupled directly or indirectly to any component of the processor system and/or via the input/output control unit 6.

The mail processor system also has a reception stage 33 or containing a modem unit 23 which may be an internal modem in the postage meter machine 1 or alternatively a modem interface for an external modem. The system also has an RS-232 interface 22 in the postage meter machine 1 and an RS-232 interface 25 in the scale 2. Communication with a remote data center DZ is enabled via modem and a communication within the mail processing system between the postage meter machine and the scale 2 is enabled via the aforementioned RS-232 interfaces 22 and 25 and a connecting cable 24 therebetween.

The communication of information comprising name and validity date (of certain data) to the postage meter machine 1 ensues from the data center DZ, for example in a communication mode during recrediting. Alternatively, some other form of notification can be selected. For example, a chip card 10 can be sent to the customer site at which the postage meter machine 1 is located, which contains the aforementioned information in addition to the further updating data, or a postage rate table in a separate memory area which is immediately interrogated by the user, or whose information is immediately loaded into the postage meter machine. The actual transmission of the new schedule only ensues later as needed. Portable mail processing systems that are not activated in the meantime, or are not ready to operate, also receive such updating data ahead of the effective time immediately upon being turned on. This is especially assured by the monitoring of the check data communicated from the scale and monitoring the information loaded in the aforementioned way with the collaboration of the clock/date module 9 powered by a separate energy source. A decision is made on the basis of the date set for the postmark whether the data in the scale 2 identified by the check data are still current or whether information is already present necessitating that these data must be updated. When, the conditions for "official" updating are present, or have matured to require that updating data be loaded, a specific chip card (of which chip card 10 is representative) identified by an identification number must be plugged into the slot of the write/read interface 20 of the postage meter machine 1 in order to load a corresponding table section into the scale 2.

Alternatively, an external memory with updating data can also be provided in a communication network and can be addressed by a corresponding communication connection. Assuming an intermediate storage in a transmission means and an automatic acceptance of the current schedule by the postage meter machine 1, tabular data packets are then transmitted into the scale 2 under the control of the postage meter machine 1.

As noted above, the mail processing system has a modem unit 23, which may be a modem or a modem interface for the connection of an external modem, in order to load data into the postage meter machine 1 or the scale 2. In a first embodiment a communication network that contains a memory with the callable data and/or a flag for reloading auxiliary functions and information into the postage meter machine is utilized as a first transmission means.

Alternatively, the transmission means can be the chip card 10 that is brought into contact with the chip card write/read interface unit 20 serving as an input means.

The interface motherboard of the chip card write/read unit 20 is connected to a serial interface of the postage meter machine. At least six contacts are provided and the data exchange between the unprotected and/or the protected card memory area and a non-volatile memory of the program memory of the postage meter machine 1 is automatically serially undertaken in the framework of a communication protocol as soon as the chip card 10 has been plugged into the contact receptacle in the card-receiving slot.

In addition to being used for entering location, a personal chip card of the user also can be used as a second transmission means for setting an advertising slogan dependent on the cost center, as disclosed by European Application 566 225. The user-related settings for the cost center and for the advertising slogan via the keyboard 8 of the postage meter machine 1 that are otherwise acquired are thus eliminated. Additionally, a corresponding postmark or slogan text is communicated for setting in order to be able to modify the existing print image data already stored in conformity with the change in location.

German OS 40 33 164 discloses accessing a chip card that contains new advertising slogan data in one of its two memory areas during printing. Differing therefrom, however, the advertising slogan in the present apparatus and method need be only partially reloaded and these parts are reloaded only once after a change in location.

An arrangement and a method for modifying advertising text parts for postage meter machines is disclosed in German OS 42 21 270 corresponding to U.S. Pat. No. 5,471,925 and, of course, can also be utilized for the allocation of semi-variable window data, which are related to the place name in the postmark, to the other data. Differing from this known approach, however, the text part is not edited with the input means of the postage meter machine 1 of the invention. On the contrary, the authorized text part is merely reloaded.

This type of reloading is especially provided for digital printing methods which allow variable or semi-variable window pixel field data to be embedded into constant frame pixel field data. Such a method for controlling column-by-column printing of a postage stamp format in a postage meter machine is disclosed, for example, in European Application 578 042.

The postage meter machine 1 is equipped with a non-volatile memory for a plurality of advertising slogans respectively allocated to the cost center of the user and with a chip card write/read unit 20 and thus enables a more frequent change of cards for a plurality of users.

A procedure for loading or updating data is stored in the aforementioned special circuits that are present in the non-volatile memory areas of the clock/date module 9 and/or of the memory 3. The protected postal area of the processor system of the postage meter machine can, for example, be fashioned as an ASIC—in a way not shown here—, so that the executive sequence cannot be manipulated in unauthorized fashion.

An input/output port 26 that is in communication with the internal bus 43 of the processor 27 of the scale 2 is connected to the RS-232 interface 25 of the scale 2. Such a bus includes data, address and control lines.

The scale 2 is a modemless scale and has input and output units 42 (a keyboard) and 41 (a display) connected to the processor 27 via an I/O port 40 and also has a memory 28 connected to the processor 27 via the internal bus 43 for storing the operating software of the scale, a memory 29 for storing application data (for example, selected dialing numbers) and a memory 30 for storing updating data (for example, the postage tables). Other than the cable 24 and the input unit (keyboard) 42, the scale 2 has no other means for entering data therein ("data" meaning electronic data since the scale 2, of course, obtains weight data when an item is placed on its weighing pan). For calculating the weight, a weighing cell 50 is connected via an A/D converter 51 to the processor 27 and direct connections also serve the purpose of resetting (reset) or taring (tara) the weighing cell 50 by the processor 27.

When, in normal mode, the scale 2 is connected to the postage meter machine 1, the two collaborate in master/slave operation, whereby the scale 2 commands have priority. The scale 2 is master and the postage meter machine 1 is slave. When, for example, a selective printing number is entered via the keyboard 42 of the scale 2 and is communicated to the postage meter machine 1, the selected print appears next to the franking at the left during printing (valuation, postmark, advertising slogan). Selected printings are combinations of type of mailing (for example, letter) and form of mailing (for example, registered), and can be programmed into the scale 2 according to the imprint configuration of the postage meter machine.

All necessary inputs are undertaken via the keyboard 42. Important information such as, for example, the weight of the postal matter and the postage calculated on the basis of the postage rate table are shown on the display 41.

Updating data can be loaded when the scale 2 is switched into the updating mode. The updating data relate to various application data and, in particular, to the postage rate table that is to be entirely or partially modified. In the updating mode, the postage meter machine 1 is master and the scale 2 is slave.

As a memory medium for the updating data, the scale 2 has a flash-EEPROM 30. Before loading the new postage rate table or corresponding updating data, the memory areas in the flash-EEPROM 30 that contain the old postage rate table or the data to be modified must be erased.

If the memory for updating data flash-EEPROM 30 has a sufficiently large memory capacity, the memory area can be advantageously divided into zones. A lower memory area is employed for the postage table, a second memory area can be employed for other settings of the scale, for example for sorting the zip-to-zone conversion tables for the USA. When postage values are to be calculated in the USA, then the destination point (destination zip code) becomes necessary for the postage calculation beginning at a specific weight.

A separate conversion table exists for every location. When the scale 2 is initialized for its location, then the corresponding zip-to-zone conversion table is read from the memory for updating data in the flash-EEPROM 30, and the table is compressed and is stored in the memory EEPROM 29 for application data of the scale 2. An initialization for the respective location is thus always included in the updating of the postage rate table. When, for example, the location is to be moved to a different city, changes must be entered into the postage meter machine 1 (place name and the postmark) and into the scale 2. The postage meter machine 1 can monitor the current nature of the input or setting to the location.

In the updating mode of the scale 2, compressed data are read into the internal RAM 34 of the processor 27 in one embodiment and are decompressed with the assistance of the operating software stored in the EPROM 28. In another embodiment, compressed data are read in the internal RAM 34 of the processor 27 in the updating mode of the scale 2, and only specific data blocks are decompressed with the operating software stored in the EPROM 28. All conversion tables can be stored compressed in the memory for updating data in the flash-EEPROM 30 but all postage rate tables can also be stored decompressed therein.

For reading the zip-to-zone conversion table into the memory for application data, EEPROM 29, the corresponding chip select line CS3 from the processor 27 is directly or indirectly activated via a connected switch 32. Only the conversion table of the location that is read out of the application data EEPROM 29 is required when calculating postage.

In a first embodiment of the flash-EEPROM 30, which operates with simplified, or without, special protocol and which is shown in FIG. 2, upon request an addressable auxiliary circuit 31 applies a 12 volt programming voltage to the flash-EEPROM 30 when, for example, postage tables are to be stored.

A programming voltage of 5 volts is required for another embodiment (not shown) of the flash-EEPROM 30. Moreover, a specific protocol must be processed in order to erase and program the module.

To protect against unintended or unauthorized erasing, it is advantageous for the aforementioned auxiliary circuit 31 is to be expanded to form a programmable security means. This security means formed by the circuit 31 can be integrated in the memory 30. It is therefore inventively provided that the scale 2 has first means that include memories 28, 29, 30, display and input unit 41 and 42, as well as the circuit 31 forming programmable security means, to prevent unauthorized erasure of data blocks in the memory 30 for updating data.

The arrangement for data entry into the scale 2 of the mail processing system requires control by the postage meter machine 1 that for loading at least one table from transmission means via reception means into a predetermined memory area of a memory of the postage meter machine 1. It is inventively provided that, after initialization of the postage meter machine 1 in conformity with the conditions entered into the postage meter machine 1, (at least two conditions: name and date), the updating data or information (stored as data blocks in the transmission means such as the chip card 10 and which can be called linked to these conditions) are loaded into the predetermined memory space of the memory 3 and/or the clock/date module 9 of the postage meter machine 1. The postage meter machine 1 has means in the control unit 5 for checking the check data for the currently valid table data of the scale 2 communicated from the scale and/or for checking information available in the postage meter machine 1 in order to, if necessary, undertake a mode switch when a reloading requirement is found on the basis of the aforementioned conditions (name and valid date or date setting). This can ensue, for example, by means of hardware and software of the clock/date module 9.

At least one postage rate table is present in callable fashion in the transmission means such as the card 10 and, the control unit 5, upon initialization of the postage meter machine 1, controls the reception stage 33 (including the modem 2) and/or the write/read unit 20 for loading of at least one postage rate table for the scale 2 from the chip card 10 (or other transmission means) into a predetermined memory space of the memory 3 and/or the clock/date module 9. The control unit 5, on the basis of the dispatching country or location and the date entered via the card 10 or other transmission means, selects the currently valid postage rate table with which the postage fee is calculated. The control unit 5 also implements a reloading routing to update the data content in the memory 30 for the updating data of the scale 2 with new updating data. For the updating data of the scale 2, the memory 30 has at least memory areas for the postage rate tables, conversion tables and for the authorized location. Control data for the transmission to the scale 2 are stored in the memory 3 and/or the clock/date module 9 of the postage meter machine 1.

Moreover, the control unit 5 generates an appropriate signal at the end of the transmission and communicates this to the scale 2. The CPU 27 and the transmission monitor 44 of the scale 2 switch the scale 2 into the normal mode after checking and sending a corresponding handshake signal (ACK signal) and after a decompression of the data for storage, or when the transmission is ended and after an initialization.

The invention has the advantage that the usual replacement of the postage EEPROM of the scale 2 is eliminated. Instead, a new postage rate table is entirely or at least partially loaded from the transmission means into the scale 2 via the postage meter machine 1. The corresponding updating data are stored in the memory of a chip card or a communication network or in the data center. In order to be able to load the updating data, the content of the chip card is read out and is then supplied first to the postage meter machine 1 via the serial interface and then to the scale 2.

Figure 3:
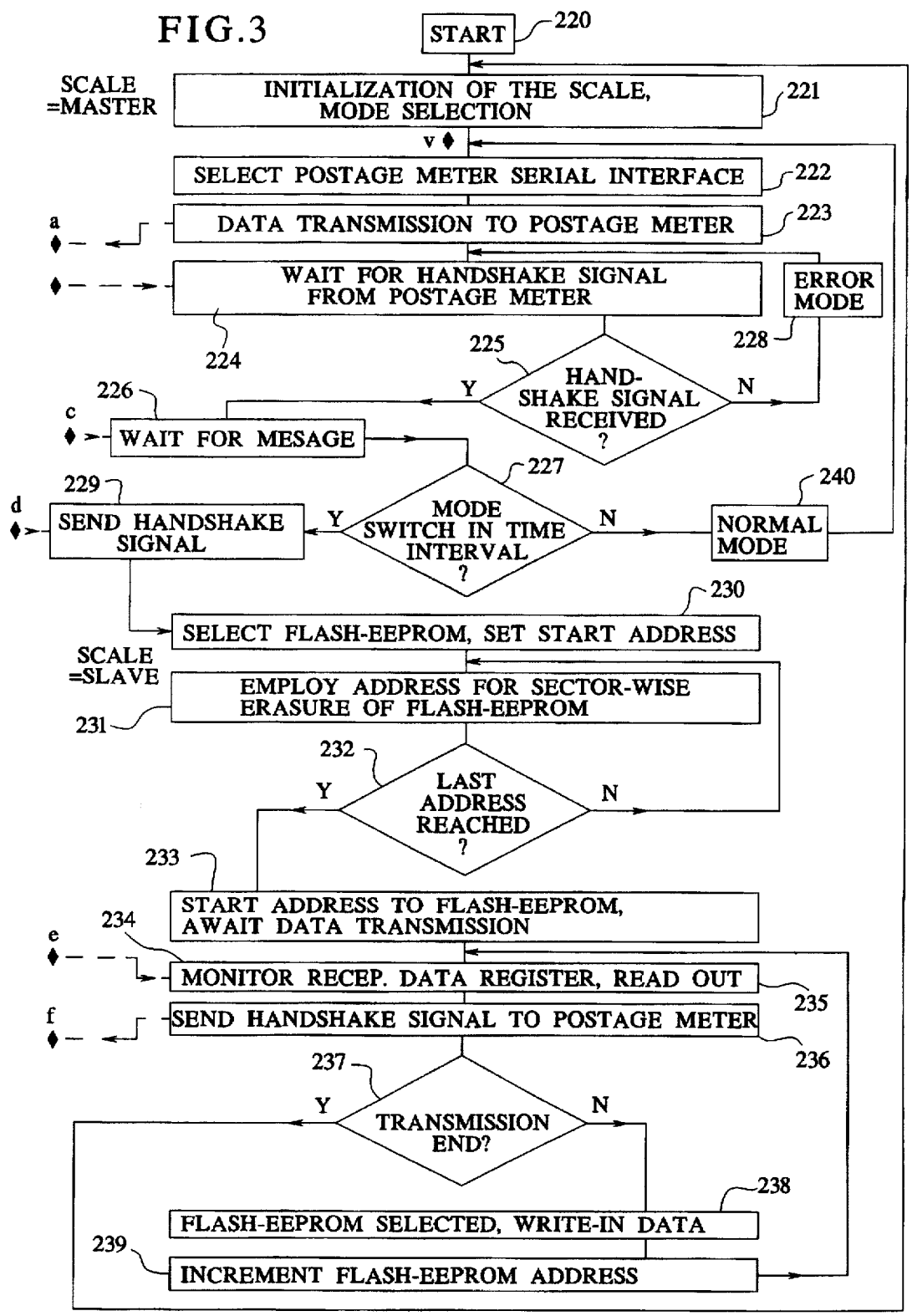
FIG. 3 is a flowchart of a data input for the scale in accordance with the principles of the invention.

FIG. 3 shows a flowchart of a data input procedure for the scale 2. After the activation of the scale 2 in step 220, the execution for the scale 2 starts, after initialization in step 221, according to the required mode selection for the mail processing system (scale=master, postage meter machine= slave). The serial interface of the postage meter machine 1 is selected in the following step 222 so that a data transmission can ensue in step 223 to the postage meter machine 1. Check data are a constituent of a first message from the scale 2 to the postage meter machine 1. In the next step 224, the scale 2 waits for a corresponding handshake signal (ACK). If no such signal arrives or if an NACK signal (non-acknowledge) is communicated, a branch is made following check step 255 via the step 228 for error reporting beck onto the step 224. Otherwise, given an ACK signal, the scale 2 waits in step 226 for a message from the postage meter machine 1 that the mode is to be switched in order to proceed into the updating mode of the scale 2 and in order to modify at least the content of one data block. In step 226, the reception data register in the I/O port 26 of the scale 2 is monitored. If no such message arrives within a defined time interval, the scale 2 (master) remains in the normal mode and can then be correspondingly operated in step 240 in order to calculate postage values and transmit them to the postage meter machine 1 (slave).

If, however, a message for mode switching arrives during the time interval, a corresponding handshake signal is sent to the postage meter machine 1 in step 229 and a branch is then made to step 230 in order to select the flash-EEPROM 30 and to correspondingly set the start address derived from the name of the at least one data block.

The address in order to erase the flash-EEPROM 30 by sectors is applied in step 231. A check is carried out in step 232 to determine whether the last address has been reached. When this is the case, a branch is made to step 233 in order to apply the start address to the flash-EEPROM 30 and in order to wait for the data transmission from the postage meter machine 1. Otherwise, a branch is made back to step 231 in order to erase the next sector.

A data transmission can now ensue from the postage meter machine 1, the data coming from internal memories (such as the memory 3 and/or the clock/date module 9) of the postage meter machine 1 and/or from external sources, for example from the chip card 10.

In step 234, the reception data register in the I/O port 26 of the scale 2 is monitored and the received data block is mad out (235) and stored in the internal RAM 34 of the processor 27 of the scale 2. The transmission monitor 44 in the I/O port 26 monitors a time value or other relevant values in order to identify an end or an interruption of the data transmission and in order to generate an ACK or an NACK signal as warranted. In step 236, a corresponding handshake signal is then communicated to the postage meter machine 1. In the following step 237, the processor 27 determines whether the transmission is at an end in order to then branch back to the initialization step 221 of the scale 2 or, if the transmission has not yet been ended, to branch to the step 238. In this step 238, the flash-EEPROM 30 is now selected in order to write in the data blocks. Subsequently, in step 239 the flash-EEPROM 30 address is incremented or advanced in order to be able to write in a further data block. To that end, a branch is again made back to steps 234 and 235. When the monitoring has been ended, an automatic editing of application data can ensue in the initialization in step 221. As dictated by a data block identifying the location, which is likewise identified with name and valid date, the corresponding zip-to-zone conversion table is then written decompressed in the memory means for application data, EEPROM 29. In step 222, the serial interface of the postage meter machine 1 is then again selected. In step 223, check data are read out from the EEPROM 29 and are communicated to the postage meter machine 1.

Such check data relate to the names of relevant data blocks that can be updated and to the associated valid date. At least one bit sequence for such changes that become valid beginning with a certain date or which are to be undertaken immediately is present in every data block.

Figure 4:
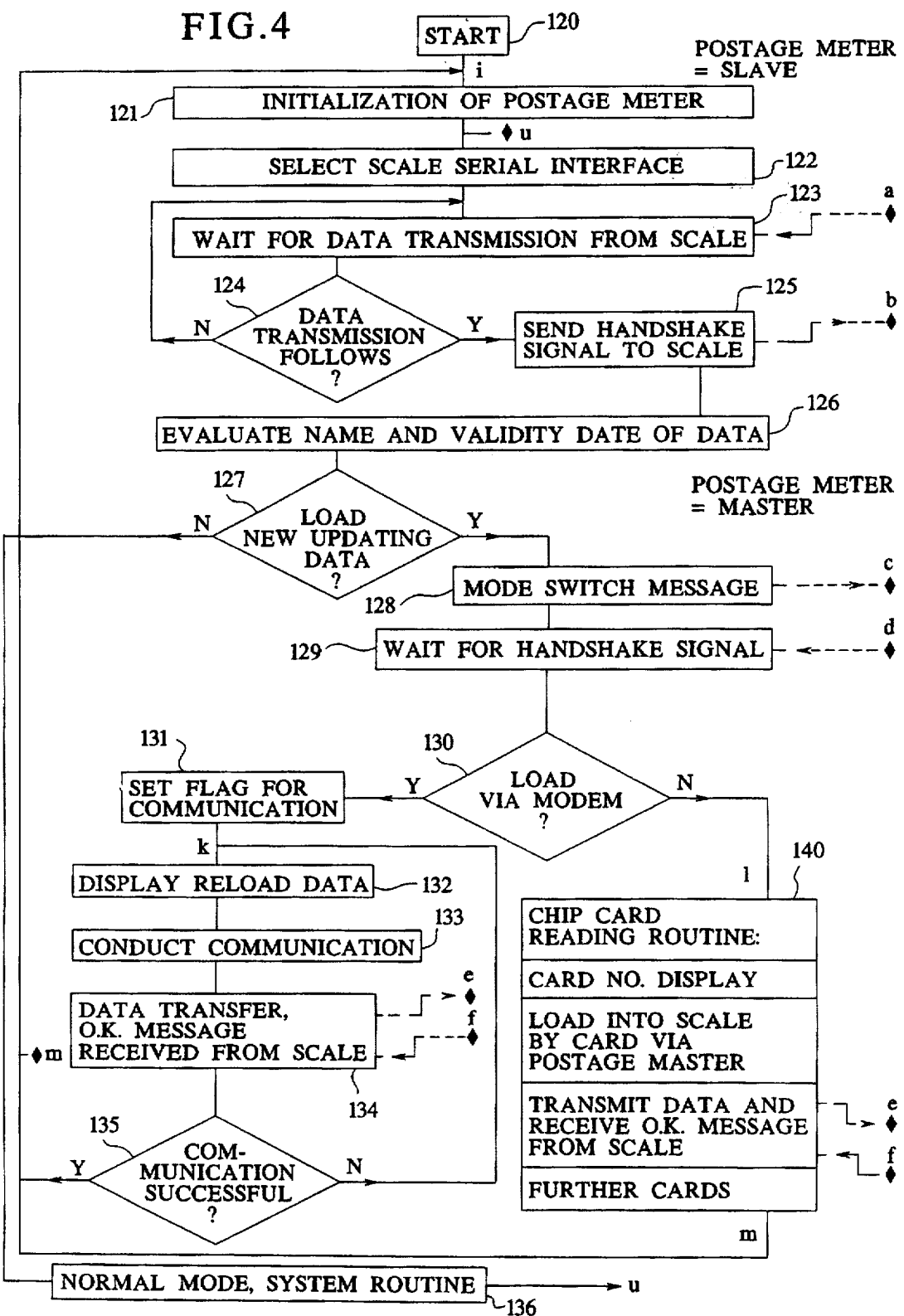
FIG. 4 is a flowchart of a data input for the postage meter machine in accordance with the principles of the invention.

FIG. 4 shows a flowchart of a data input procedure for the postage meter machine 1 that, at the points referenced a–f, is correlated with the corresponding flowchart of the scale shown in FIG. 3.

After the start (step 120), in an initialization of the postage meter machine 1 ensues in step 121, a determination is made to determine whether the scale key has been pressed and a switch is thus made into the corresponding mail processing system mode. The postage meter machine 1 now operates as slave and the scale 2 operates as master. In step 122, the serial interface of the scale 2 is selected. Subsequently, in step 123, the postage meter machine 1 waits for a data transmission from the scale 2 wherein check data are communicated. When the data transmission has ensued (step 124), a branch is made to step 125 in order to communicate a corresponding handshake signal to the scale 2. Otherwise, a branch is made back to step 123. In step 126, the postage meter machine 1 enables an evaluation of the communicated check data on the basis of the main and valid date of each relevant data block. In step 127, a decision can now be made as to whether the loading of new updating data is required. If not, the normal mode 136 is reached.

Corresponding to the evaluation in step 126, i.e. when new updating data must be loaded (step 127), a communication about the mode switch to be undertaken ensues in step 128.

The postage meter machine 1 now operates as master and the scale 2 operates as slave. As was already set forth in conjunction with FIG. 3, the scale software is consequently likewise brought into a corresponding routine which enables a modification of the data in the corresponding memory areas.

In step 129, the postage meter machine 1 waits for a corresponding handshake signal from the scale 2 with an error message (not shown in FIG. 4) being generated if no handshake signal or when an NACA signal is communicated. If an ACK signal is communicated, a branch is made to step 130. Dependent on how the postage meter machine 1 has been configured, a reloading of updating data now ensues from an external source via modem 23 (steps 131–135) or via the chip card write/read unit 20 (step 140). Subsequently, a branch is made back to the initialization step 121. The postage meter machine 1 now operates again as slave.

In the aforementioned steps 131–135, a flag for a communication is set in step 131, and in step 132 a display routine is executed to display the reload data before a communication is conducted in step 133. Data transmission in this communication takes place in step 134, and in step 135 a check is made to determine whether the updating was successful. If the communication was not successful, steps 132, 133 and 134 are repeated. If the communication was successful then, as noted above, a branch is made back to the initialization step 121.

After the check steps 122–127, the mail processing system continues to operate in the normal mode for because no loading of further updating data is required. A branch is therefore made to the system routine in which input and other criteria are interrogated. An automatic check according to step 126 can thereby also be undertaken when the date setting is modified in order to frank mail in the future. The interrogation step 127 is then reached again in order to prevent mail to be sent in the future from being franked with the superseded schedules.

In the updating mode for the scale 2, further chip cards can also be read, as was described in European Application 566 225 in order to load data into the postage meter machine 1. First transmission means are employed for a location-specific editing of window data for the postmark or auxiliary functions for the postage meter machine 1 and current information for a permanent and/or temporary configuration of at least one scale 2, and second transmission means are employed for user-associated setting of the postage meter machine.

The first transmission means can be the integrated chip card 10 and a second chip card (not shown) can be employed as the second transmission means, each of these respectively have a memory with the fetchable data blocks for reloading updating data into the scale 2 and/or information and auxiliary functions into the postage meter machine 1 as well as updating data into the scale 2.

Figures 5, 8:
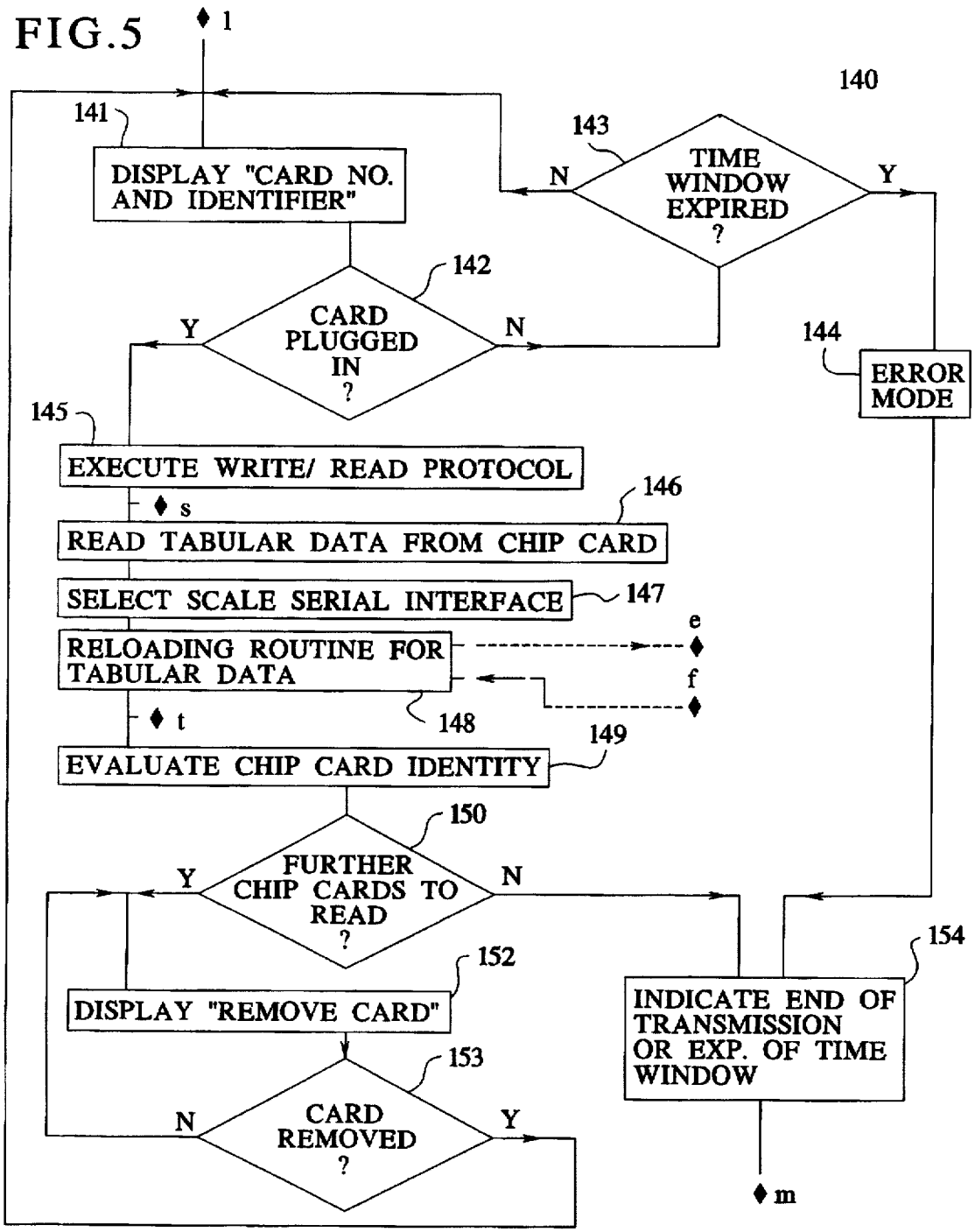
FIG. 5 is a flowchart for the read-out of data from the chip card in accordance with the principles of the invention.
FIG. 8 is a schematic illustration of the format of a data block stored in the external memory means in accordance with the principles of the invention.

FIG. 5 shows a detailed flowchart for reading data from the chip card 10 according to step 140 shown in FIG. 4. Following point I, the card identifier of that chip card 10 that must be plugged into the slot of the postage meter machine 1 first for updating is displayed in step 141. In step 142, a check is then made to determine whether the corresponding chip card 10 has been plugged in. If no card has been plugged in, a branch is made via step 143 back to point I, this sub-routine being repeated executed until, for example, a time window for plugging in a card has expired. Otherwise, a branch is made via step 144 for error reporting to the step 154, and a display is informed that the end of the time window for plugging in has been reached before the point m, and thus before the next step or according to FIG. 4, the point i is reached. This leads to the repetition of the executive sequence that has already been set forth until the current nature of the data was capable of being produced. If the card 10 is plugged during the time window, the protocol with the write/read unit 20 of the postage meter machine 1 is begun in step 145, as described in FIG. 5 of European Application 566 225. Only the content of the data blocks to be read from the chip card 10 differs and is intended to be loaded into the scale 2.

With these data blocks, the postage meter machine has begun in step 146 to read tabular data from the chip card 10. This aforementioned step 146 includes sub-steps 1461–1464 for the routine for reading the tabular data out of the chip card that are described in greater detail in FIG. 6.

After this, the serial interface to the scale 2 selected in step 147 before step 148 with the reloading routine for tabular data is reached.

Figure 7:
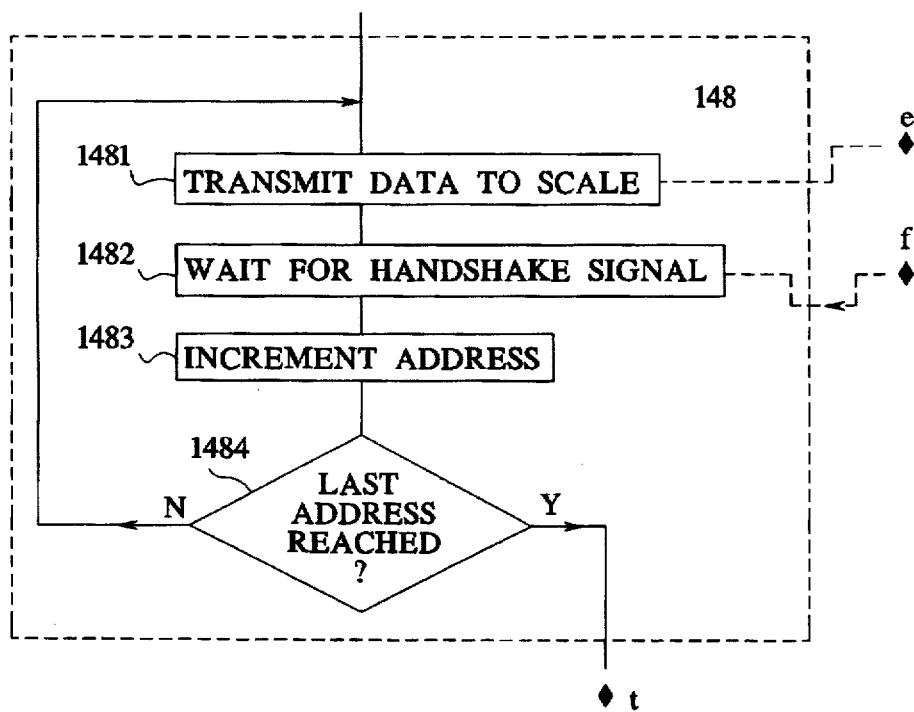
FIG. 7 shows a reloading routine for the postage meter machine in order to implement a data transmission to the scale in accordance with the principles of the invention.

The reloading routine called in in step 148 for the postage meter machine 1 in order to implement a data transmission to the scale 2 is set forth in greater detail in FIG. 7.

In the following step 149—shown in FIG. 5—, the identifier of the chip card 10 is interpreted in order to identify the next required chip card 10 that is to be plugged into the slot. In step 150, the control units of the postage meter machine 1 can now decide whether further chip cards must be read in order to load further updating data or whether the end of the routine, and thus point m, has been reached with step 154. Otherwise, a display is made in display step 152 that the chip card having the displayed number should be removed and a check is made in the check step 153 whether the chip card having that number was removed. When this has ensued, a branch is made back to point I in order to request the plug-in of the next chip card in the display step 141. Otherwise, a branch is made back to the display step 152.

Figure 6:
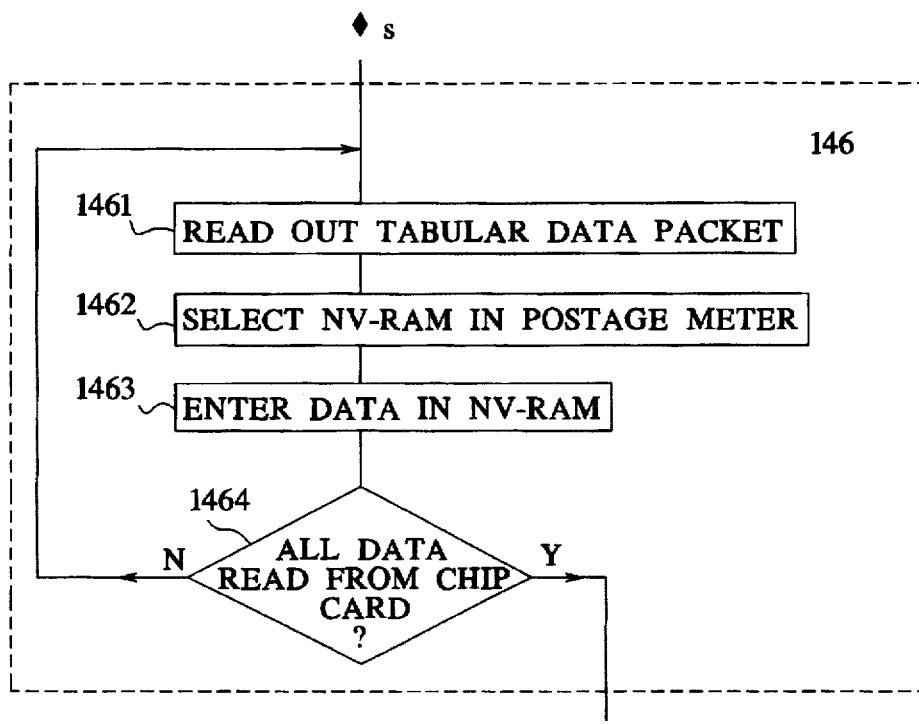
FIG. 6 shows a routine for reading tabular data out of the chip card in accordance with the principles of the invention.

According to FIG. 6, the routine for tabular data read-out from the chip card 10 includes the sub-step 1461 for reading the tabular data packet out, the sub-step 1462 for selecting the NV-RAM 3 and/or the clock/date module 9 in the postage meter machine 1 into which tabular data are to be entered and intermediately stored in the following sub-step 1463. It is thereby possible to intermediately store a portion of the complete data in order to transfer this portion into the scale 2 immediately in step 148. If adequate memory capacity is present, however, all or most of the data to be transmitted can be initially intermediately stored at first in the postage meter machine 1, then being forwarded only when the scale 2 is connected. In the latter instance, an inquiry is made in sub-step 1464 to see whether all required data have been read from the chip card 10 in order to otherwise branch back to the sub-step 1461 in point s. In the former instance, an inquiry is made (not shown in FIG. 5) in sub-step 1464 following the step 148 preceding the point t to determine whether all updating data required at the time have been read from the chip card 10 in order to otherwise branch back to the sub-step 1461 in point s.

When updating data have been read out and when the serial interface to the scale 2 was selected in step 147, the reloading routine 148 (shown in FIG. 7) for the postage meter machine 1 has been reached. In order to implement a data transmission to the scale, a sub-step 1481 is first implemented in order to wait for a handshake signal from the scale 2 in sub-step 1482. In sub-step 1483, the next address is then generated, preferably by incrementation, and a check is carried out in sub-step 1484 to determine whether the last address has been reached. A branch can then be made to point t. Otherwise, a branch is made back to sub-step 1481. The routine is provided for the aforementioned, latter instance but can also be adapted to the former instance in which fewer addresses have to be interrogated.

FIG. 8 shows a data block stored in the external memory means. In addition to the actual updating data, such a data block contains the name of this data block and the associated valid date of when the modification takes effect. The name of such an aforementioned data block includes the name of that mail carrier, or its carrier identification number CIN, who has supplied the postage rate table. The updating data include a validity timespan, or an earliest validity date, particularly with respect to a postage rate table.

As noted above, the scale 2 is connected to the postage meter machine 1 via interfaces 22 and 25. An automatic modification of the most recent status of stored data contents in a postage meter machine 1 for the setting thereof ensues within a time window after activation when the data effecting the modification and/or flags are loaded from an external memory into a memory area of the non-volatile memory 3 and/or the non-volatile memory of the clock/date module 9. In conjunction with, in particular, a loading by modem, the method for data input into the scale 2 of the mail processing system includes the further, following steps:

I) Initialization of the postage meter machine 1 and of the scale 2 that are connected to one another via interfaces and via a connecting cable 24, for postage calculation, for communicating the amount of postage in the normal mode, for data communication of check data to the postage meter machine, and for mode switching;

II) Automatic checking of the most recent status of data contents stored in the scale 2 after the mail processing system has been switched on, with reference to check data communicated to the postage meter machine 1 and on the basis of information about the modification to be undertaken in future and about the relevant valid date that were previously stored in the postage meter machine 1;

III) Location-specific editing of data for at least the scale 2 from an external source via a communication network, for reloading at least the updating data into the scale 2;

IV) Updating the internally stored data after mode switching, whereby updating data are transmitted via the postage meter machine 1 to the scale 2 in a step 134.

The implementation of steps I-IV assumes a postage meter machine 1 connected to the scale 2, this postage meter machine comprising a correspondingly programmed processor system as described above. A permanent memory, which is a component of the memory 3 of the postage meter machine 1, contains programs for communication from an external source via modem 23 or reception stage 33 or read/write unit 20 or for a communication with externally connected devices via interfaces 21 and 22 (FIG. 2).

The reception means formed by one of the reception stage 33, the modem 23 or the read/write unit 20 are in a communicative connection with the CPU 5a of the postage meter machine 1. The CPU 5a is programmed to load the updating data and/or information from the external source into the memory 3 and/or the clock/date module 9 after initialization or after the postage meter machine 1 is turned on in conformity with the at least two conditions (name and date) that have been input and are stored in the postage meter machine 1.

The CPU 5a is in an operative communication with an (aforementioned) circuit programmed to:

(i) check the check data communicated by the CPU 27 and I/O unit 26 of the scale 2 to the postage meter machine 1 for the tabular data of the scale 2 currently in effect and/or checking the information that are available in the postage meter machine 1 in order to potentially undertake a mode switching when a reloading requirement has been found; and (ii) store control data for the transmission of updating data to the scale 2 in the write/read memory 3 and/or in the clock/date module 9 of the postage meter machine 1.

Via the I/O port 26, the processor 27 of the scale 2 is connected to the auxiliary circuit 31 operating as security means to prevent unauthorized erasure of data blocks in the memory 30 for updating data, and is also connected to memories 29 and 30 for updating the contents thereof with the aforementioned updating data. Under control of the operating software stored in the memory 28, the processor 27 of the scale 2 is programmed:

for location-specific initialization of the scale;

for communicating a calculated postage fee;

for data communication of check data to the postage meter machine 1;

for mode switching and for updating the corresponding data stored in memories 29 and 30.

For location-specific initialization of the scale 2 in conjunction with modem and mobile radio telephone services that allow a location determination to be undertaken by the data center DZ in a short time, data are formed in the scale 2 in a step 221 (FIG. 3) and are transmitted to the postage meter machine (in step 223, FIG. 3), the data being interpreted therein as a reloading requirement (in step 126, FIG. 4). For example, the data for such a reloading requirement can be formed by overwriting with a predetermined data value or by erasing the names for country, region (in Germany, sate in the USA) or place in a sub-step of step 221.

The data that relate to a change of location and that are to be previously authorized by the data center DZ can, of course, only reach the recipient when the recipient's telephone number agrees on site. In one embodiment, the postage meter machine 1 is programmed to communicate the telephone number of its connection to the data center DZ. In another embodiment, the determination of location is supplied by the customer's telecommunication service provider.

Telephone and mobile radio telephone services allow a location determination to be undertaken in a short time by the data center during a single call when the postage meter machine 1 calls the data center DZ and data that unambiguously identify the calling party are inserted between the selection signals by the locally responsible exchange. An analog modem utilized in the data center DZ is correspondingly programmed to filter out such local identification data out. To that end, it is necessary that the selection signals are communicated to the data center DZ using dual tone multi-frequency signalling (DTMF).

If a digital modem is used, particularly an ISDN modem, the ISDN system feature "identify the calling terminal" can be advantageously utilized from the telephone terminal equipment to which the postage meter machine is connected. That part of the telephone number that unambiguously identifies the terminal equipment is generated by the telephone exchange to which the terminal is allocated.

If a location entry is to be made via a chip card 10, an authorization must be previously obtained. This is time-consuming but allows a registration of the location for the respective mail processing system in the data center DZ. The location-specific editing of data optionally ensues with a card-shaped transmission means or with external memories on the basis of a communication network (modem, mobile radio telephone), corresponding to the existing type of postage meter machine 1.

In another embodiment, an input of the location is undertaken, for example, with the scale keyboard 42 instead of by remote data transmission or chip card. The scale 2, for example, is turned on by a new user after having been moved from one place to another. Such an input possibility is available present after the activation in a sub-step of step 221 of the initialization of the scale 2 by entering the postal zip code PLZ into the scale 2. After entry of the last numeral (the PLZ in Germany has five places and that part of the zip code to be entered in the USA has three places), the input is automatically accepted. Independently thereof, an updating can be implemented after such an initialization under the control of the postage meter machine 1 via a communication network or transmission means, whereby a location-specific editing of data for the scale 2 and the postage meter machine 1 ensues in an external memory.

The scale can be initialized before the storing of application data for the respective location otherwise an authorized text part for the location in the postmark must be loaded into the postage meter machine 1 when a change in location has been undertaken. This requires a data communication of check data to the postage meter machine 1 so that a determination regarding the presence of an updating or reloading requirement can be made therein.

The CPU 5a of the postage meter machine 1 determines a reloading requirement on the basis of the conditions offered in the write/read memory 3 and/or by conditions predetermined by a clock/date module 9 of the postage meter machine 1 (name and valid date or, respectively, date setting). The updating data or information for the postage meter machine 1 and for the scale 2 can be available as data blocks stored in the transmission means such as the chip card 10 or in a memory arranged externally of the postage meter machine 1 and being fetchable therefrom when predetermined conditions are present.

The aforementioned flowchart of a data input procedure for the postage meter machine 1 shown in FIG. 4 is explained in greater detail for a loading by modem. When a corresponding handshake signal (ACK signal) reaches the postage meter machine 1 in step 129, a branch is made to step 130. For example, the postage meter machine 1 has been configured at the factory such that a reloading of updating data from an external memory ensues by modem 23 (steps 131–135).

A reloading requirement found by the postage meter machine in step 126 (FIG. 4) is evaluated as a transaction request in step 127 and for communication in step 133. The aforementioned, predetermined conditions (name and valid date or date setting) are previously communicated by the aforementioned reception means in the postage meter machine 1 in conjunction with the CPU 5a and the aforementioned special circuit and by the keyboard 8. These conditions may alternatively have been supplied from the scale 2 by means of the keyboard 42 and the CPU 27 and I/O unit 26 via interfaces 22 and 25. The conditions are stored in the write/read memory 3.

Figure 9:
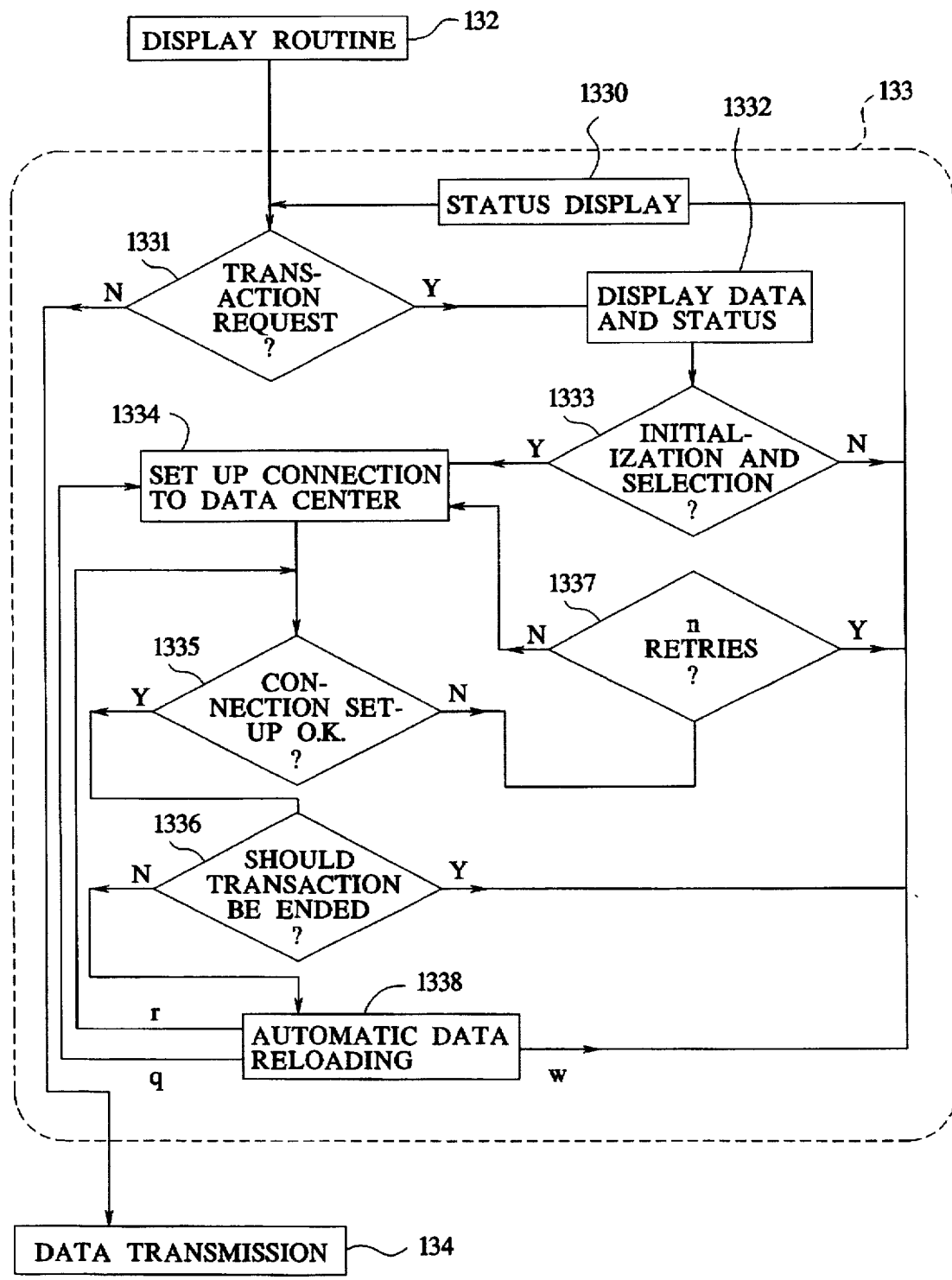
FIG. 9 is a sub-flowchart in the postage meter machine for an automatic communication by modem in accordance with the principles of the invention.

FIG. 9 shows a flowchart of a subroutine that is executed in the postage meter machine 1 for the purpose of an automatic communication by modem in the step 133, after step 132 (displaying) and before step 134 (data transmission) for updating. A recognized transaction request in sub-step 1331 of the step 133 leads to the display of the data and the status in sub-step 1332 in order to subsequently branch—after an initialization of the modem and dialing of the data center DZ (telephone number) in sub-step 1333—to a sub-step 1334 for setting up the connection to the data center DZ. If an initialization of the modem and dialing cannot be successfully implemented in sub-step 1333, a branch is made via sub-step 1330 for display of the status back to sub-step 1331. A branch is likewise made back to sub-step 1331 if it is found in a sub-step 1335 placed following sub-step 1334 that the call setup is not properly ensuing and if it is found in sub-step 1337 that the connection cannot be setup even after n redialings. As long as the minimum number of redialing attempts is less than n, a loop is executed from sub-step 1337 to sub-step 1334, wherein another attempt to set up a communication is made, which is checked in sub-step 1335.

When, however, the call setup has ensued properly and it is found in sub-step 1336 that one of the transactions has not yet ended, an automatic reloading with data ensues in sub-step 1338.

A determination is made in sub-step 1338 as to whether an error status has occurred that can be overcome by a renewed call setup to the data center in order to branch via q back to sub-step 1334. A further finding is made in sub-step 1338 as to whether an error status has occurred that cannot be eliminated in order to branch back to the sub-step 1330 via w for the purpose of status display. When a transaction has been implemented, further transactions can be implemented, whereby a branch is made back to sub-step 1335 via r. When the connection is still intact, a check is carried out in sub-step 1336 to determine whether all transactions have been implemented or whether the last transaction has been concluded in order then to branch back to sub-step 1331 via the sub-step 1330. The flag for a transaction request is reset in sub-step 1338 with the end of the last transaction. A branch is thus made from sub-step 1331 to step 134 in order to transmit selected data communicated to the postage meter machine 1 to the scale 2.

Figure 10:
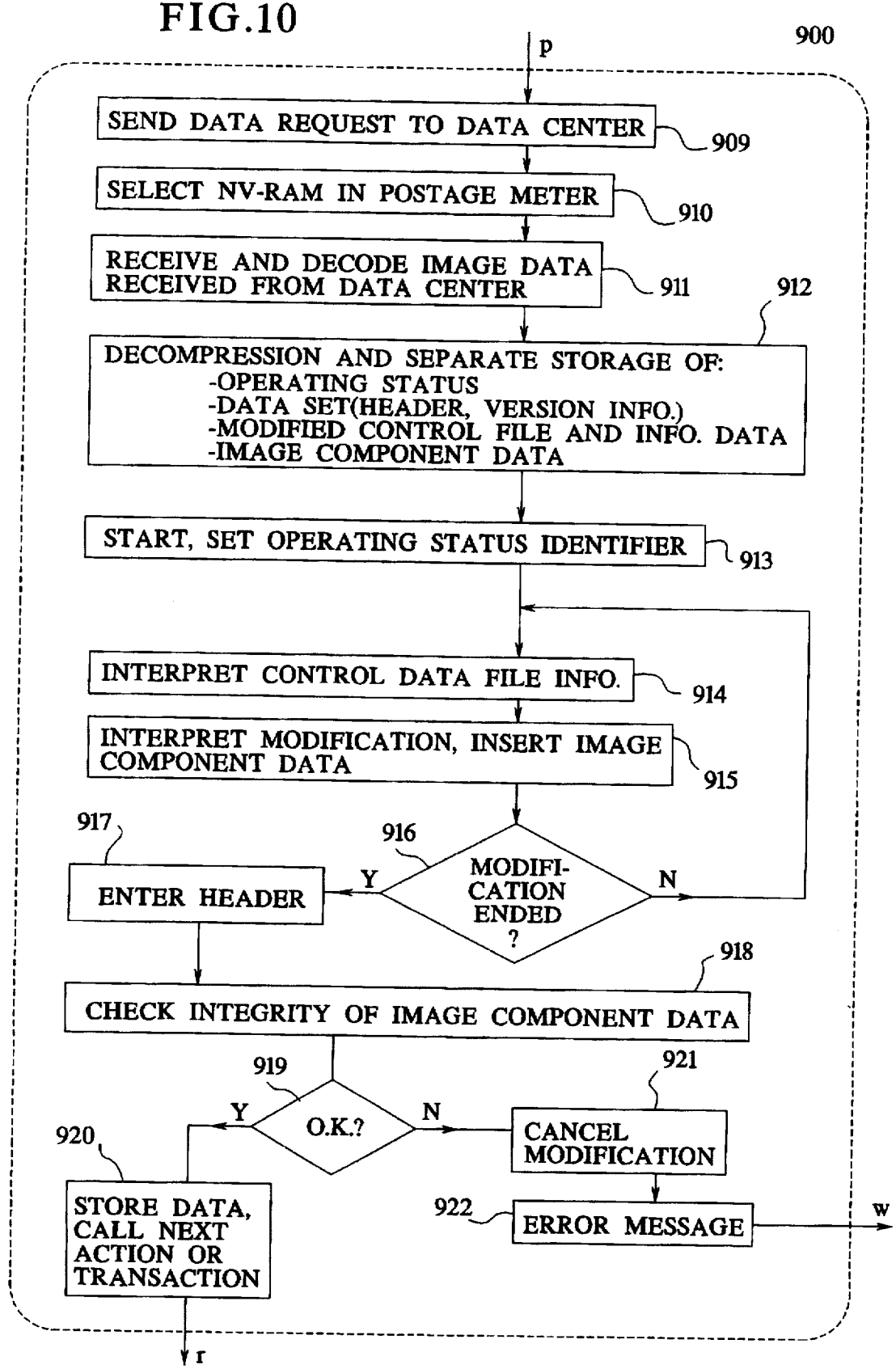
FIG. 10 shows a routine for introducing communicated sub-image data into image data in accordance with the principles of the invention.
Figure 11:
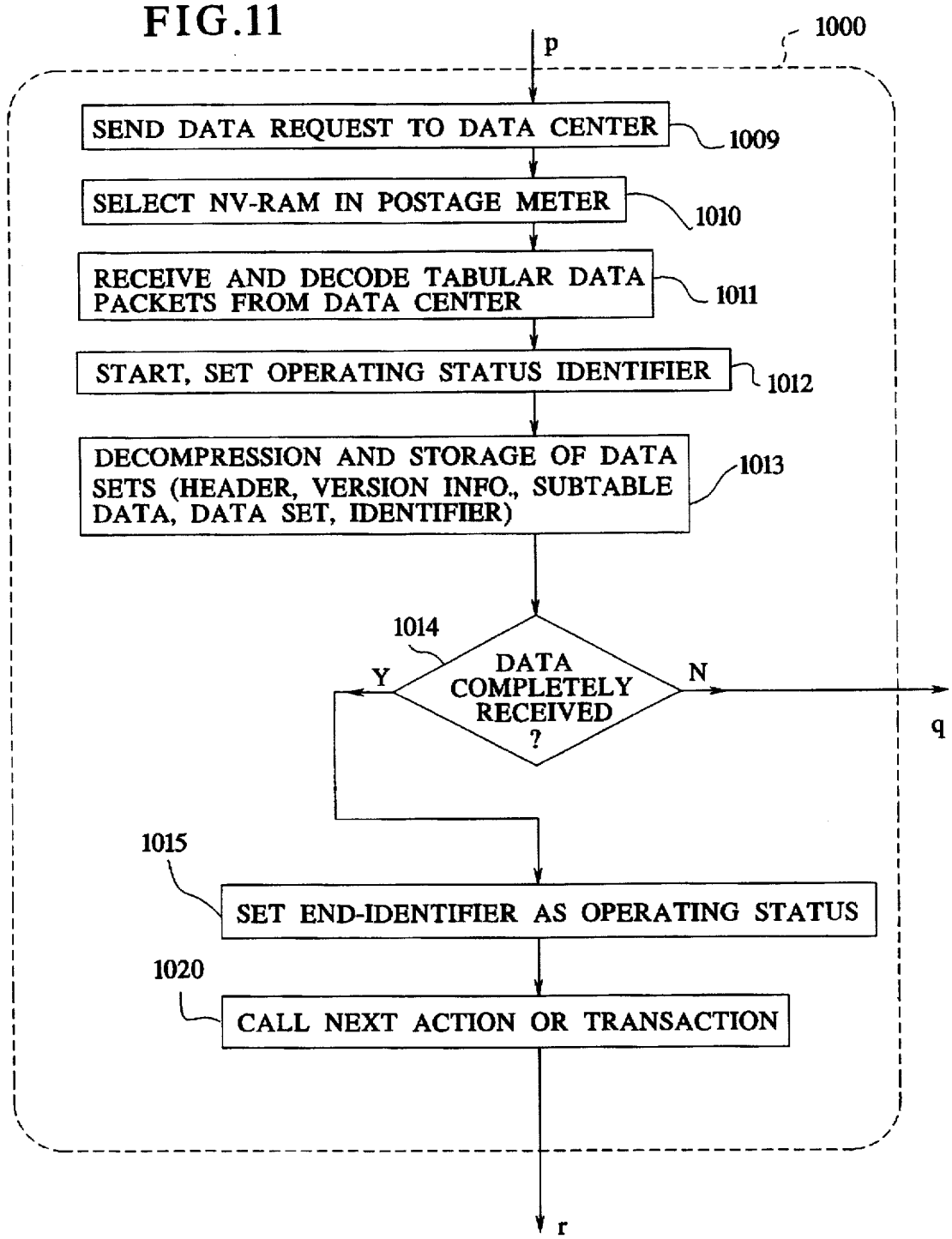
FIG. 11 shows a routine for handling communicated tabular data in the postage meter machine in accordance with the principles of the invention.

The automatic reloading with data in sub-step 1338 includes specific handling routines that are explained in greater detail in conjunction with FIGS. 10 and 11. The method offers a location-specific editing of window data for the postmark or of auxiliary functions for the postage meter machine, and also supplies current information for a permanent and/or temporary configuration of at least the scale 2 by a communication network that contains a memory with fetchable data blocks for loading auxiliary functions and information into the postage meter machine 1 and updating data into the scale 2.

FIG. 10 shows a routine for combining communicated image component data with other (basic) image data, the basic image data being stored in the postage meter machine 1. The routine enables a location-specific editing of window data for the postmark for the purpose of imprinting on a piece of mail with the postage meter machine 1.

FIG. 11 shows a routine for handling communicated tabular data in the postage meter machine 1 that are subsequently transmitted to the scale 2 (in step 134).

The routine 900 of FIG. 10 and the routine 1000 of FIG. 11 respectively comprise a sub-step 909 or 1009 for sending request data to the data center DZ.

The request data were already formed in step 126 (FIG. 4) when an updating requirement is present. Following sub-step 1336, the point p is reached for the sub-step 1338 (FIG. 9) when one of the transactions has not yet been ended. The routine 900 for combining communicated image component data into other image data according to FIG. 10 implements a sub-step 910—following the sub-step 909—for sending request data to the data center DZ in order to select a non-volatile memory area in the postage meter machine 1 into which the requested data are later intermediately stored. Following sub-step 910, a branch is made via the sub-step 911 for receiving and decoding the data packet communicated from the data center DZ to a sub-step 912 in which a first processing of the data ensues. Particularly given high transmission rates as allowed, for example, by ISDN modems, an intermediate storing and, if necessary, a subsequent decompression given packeted data ensue. A split (separate) storage of data parts can now ensue, these relating to: processing status, data set (header, version information), modified data for a control data file and for information, as well as image component data that are required for generating a complete pixel image. After this, a sub-step 913 of the start is reached in order to set an identifier for the operating status. This is required in order, even given a program abort due, for instance, to an interruption in the operating voltage, to conserve the current program status that has been achieved in non-volatile fashion in order to continue the program from this point after the return of the voltage. In the following sub-step 914, the data are then interpreted in a modification of the control data file in order subsequently to implement the required changes in sub-step 915 and insert the allocated image component data. The modification data of the control data file and the image component data are entered and stored in non-volatile fashion. A check is made in the following inquiry step 916 to determine whether the modification has ended or whether further modifications of the control data file must still be undertaken. If the modification has ended, a branch is made to sub-step 917 in order to enter the data set. Otherwise, a branch is made back from step 916 to sub-step 914 in order to implement further modifications.

When the data set was entered in sub-step 917, a check of the sub-image data for integrity can ensue in sub-step 918. An unmodified image part remains initially preserved in a part of the memory area available for access as warranted if the integrity of the data is not established or if a voltage failure occurs. A status identifier dependent on the processing status that has been achieved is thereby interpreted, as was described, for example, in European Application 572 019. In order to assure the validity of the image component data, an encrypted checksum security-protected such as, for example, by a message authentification code (MAC), can be applied, as in detail in co-pending U.S. application entitled "Method for Improving the Security of Postage Meter Machines," (Ser. No. 08/525,923 filed Sep. 8, 1995 and assigned to the same assignee, Francotyp-Postalia GmbH, as the present application) for slogan image data.

From the inquiry step 919, given the data integrity, a branch is made to sub-step 920 or, when integrity of the data is not present, a branch is to be made to sub-step 921. The processing is canceled in sub-step 921, whereby the unmodified image component data are accessed and a branch is made to point w after an error message is generated in sub-step 922. Given a proper execution and integrity of the data, a non-volatile storage of the updating data is undertaken in sub-step 920, whereby the memory areas containing unmodified image component data are overwritten. The next action or transaction is then called and a branch is made to step r, whereby a branch is made to point p of step 1000 via the inquiry steps 1335 and 1336 according to FIG. 9. Otherwise, if no next action or transaction is required, a branch is made to point r and the status display in sub-step 1330 according to FIG. 9 is reached via the inquiry steps 1335 and 1336.

The routine 1000 for handling communicated tabular data in the postage meter machine 1 shown in FIG. 11 includes a sub-step 1009 for sending a data request to the data center DZ. A sub-step 1010 is then implemented in order to select a non-volatile memory area in the postage meter machine 1 in which the requested data can be intermediately stored later. Following the sub-step 1010, a branch is made via the sub-step 1011 for receiving and decoding the data packet communicated from the data center DZ to a sub-step 1012 wherein a start processing status for a data processing is set. The first processing of the data then ensues in sub-step 1013. After intermediate storage and, if necessary, following a subsequent decompression given packeted data, storage of the data set that belongs to a complete postage rate schedule of a mail carrier then ensues. Such a data set has a header, version information, sub-table data and a data set and identifier (DEK). After this, a sub-step 1014 is reached for checking for complete reception of the communicated data packet. Given completeness, a branch is made to a sub-step 1015 in order to set an end identifier as the processing status. Such an identifier is required so that, given a program abort due, for example, to an interruption in operating voltage, the program can be continued at this point after the return of the voltage. In the following sub-step 1020, the next transaction or action is called and thus a branch is made for the further implementation of the executive sequence shown in FIG. 9 in order to transmit the intermediately stored updating data to the scale 2 in a later step 134.

If an improper executive sequence is found in sub-step 1014, the point q is reached. By branching to sub-step 1334 according to FIG. 9, a further attempt can be started in order to transmit the required sub-table data. The sub-steps 1335–1336 are thereby executed and the point p according to FIG. 11 is then reached.

After a first data transmission to the postage meter machine 1 in step 223 (FIG. 3) via the connection a, a handshake signal is sent (step 125) after the reception of the data (step 123 in FIG. 4) given a successful data transmission (step 124) before step 126 (FIG. 4) is reached for the interpretation of the data and for forming the data request. The reception of the handshake signal leads to a mode switch in the scale 2 in step 227. For preparing for the updating, the processor 27 also interrogates the stored, most recent carrier setting in order to identify the start address in the flash EEPROM 30 of the scale 2 (step 230, FIG. 3).

Figure 12:
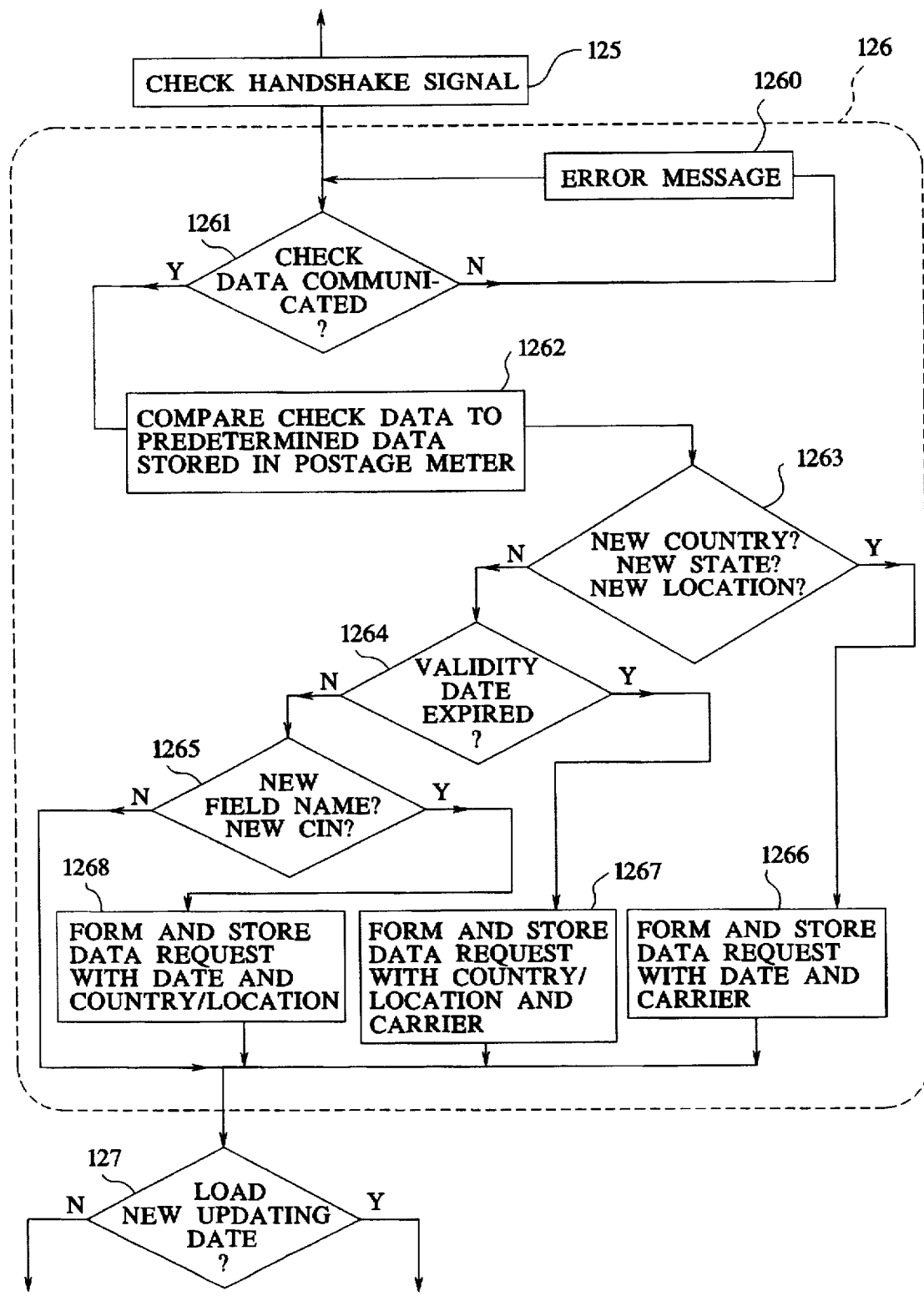
FIG. 12 shows a routine for evaluating communicated check data and for forming request data in accordance with the principles of the invention.

The routine 126 for evaluating communicated check data and for forming a data request in the postage meter machine 1 is described in greater detail with reference to FIG. 12.

If a finding is made in sub-step 1261 that check data have been communicated from the scale 2 to the postage meter machine 1, a branch to sub-step 1262 is made. Otherwise, given non-communication thereof, a branch is made back to the start via a sub-step 1260 for error reporting.

A comparison of predetermined data areas of the check data to non-volatily stored, corresponding, predetermined comparison data areas ensues in sub-step 1262 so as to be able to identify changes that have occurred or that have been entered. Specific inquiries ensue in the following sub-steps 1263–1265 in order to form specific request data in the appertaining sub-steps 1266–1268. If the machine location has changed, whereby the country, the region and/or the place was newly entered, a branch is made from sub-step 1263 to the sub-step 1266 in order to form request data together with the current date and carrier and to store them. The transgression of the validity date is checked in sub-step 1264, this validity date being allocated to each carrier-specific table, in order then to form and store request data together with the current location and carrier in step 1267. A new input of a field name is evaluated in sub-step 1265, tables and information being specifically identified therewith before branch is made to sub-step 1268 in order to form and store request data. A branch is made directly to the next step 127 only if no modifications are detected in the inquiries 1263–1265.

The CPU 5a of the postage meter machine 1 is programmed by control data stored in the memory 3 and/or in the clock/date module 9 of the postage meter machine 1 and by the aforementioned, special circuit to:

determine the conversion or postage rate table currently in force on the basis of the request data relating to dispatching country or place and relating to the date stored in the clock/date module 9 the postage meter machine 1, the request data having been previously loaded from an external source or via a chip card 10 and/or the keyboard 8 of the postage meter machine 1 or the keyboard 42 of the scale 2 and having been intermediately stored in the memory 3;

automatically check the most recent status of data contents stored in the scale 2 on the basis of check data communicated to the postage meter machine 1, with previously stored information about the modification of the validity date to be undertaken in future;

switch modes in the case of a reloading requirement;

transmit stored data sets to the postage mater machine 1 from an external source or the chip card 10 corresponding to the dispatching country or location and the date that have been entered;

transmit data sets intermediately stored in the memory 3 and/or the clock/date module 9 of the postage meter machine 1 to the scale 2 via the interfaces 22 and 25 in order to update the data content in the memory 30 for the updating data in the scale 2 with a reloading routine with new updating data, whereby the memory means 30 for the updating data of the scale at least has memory areas for the postage rate table, for conversion tables and for the authorized location, and whereby the updating ensues within a time window after activation;

store new control data for the transmission of updating data to the scale 2 in the write/read memory 3 of the postage meter machine 1.

Figure 13:
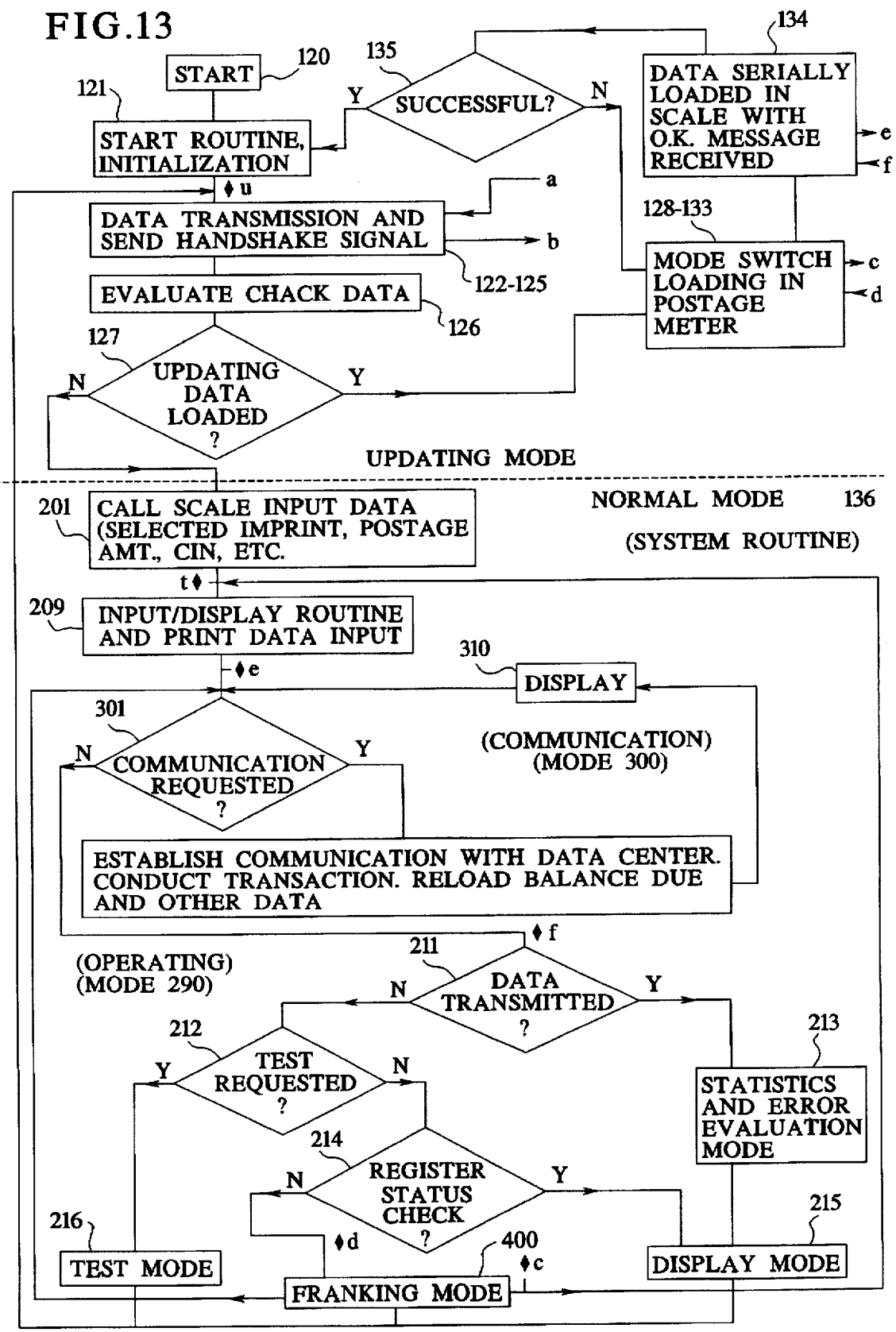
FIG. 13 is an overall flowchart for the postage meter machine in accordance with the principles of the present invention.

FIG. 13 shows an overall flowchart for the postage meter machine with updating mode and with normal mode. Steps 120–135 are executed in the updating mode, as was already explained in conjunction with FIG. 4. In step 126 for evaluating check data, the sub-steps 1260–1268 previously explained with reference to FIG. 2 are executed before a branch is made to the inquiry step 127. If request data were formed in step 126, then new updating data are to be loaded and a branch is made from the inquiry step 127 (if the result of the inquiry is affirmative) to steps 128–133 in order to undertake a mode switch to operate the postage meter machine 1 as master and to load the required updating data into the postage meter machine 1 in conformity with the request data. A transmission of those updating data that are required by the scale 2 to the scale 2 ensues in the following step 134. A successful updating of the data stored in the scale 2 is determined in step 135 and a branch is then made back to the initialization routine, whereby the mode switching is in turn canceled. The postage mater machine 1 is again in the slave status in steps 122–127.

The scale input data that were transmitted to the postage meter machine 1 in step 123 are now called in step 201. The communicated scale input data relate to selective imprint, carrier identification number CIN, possibly to the minimum validity duration of the postage rate belonging to the CIN and to the calculated postage fee for a weighed piece of mail, as well as potentially to the measured value of the weight. If the minimum validity duration of the postage rate table pertaining to the CIN is present in the postage meter machine 1 allocated to the CIN, the minimum validity duration need not be communicated from the scale. After a communication of the selected CIN from the scale 2 to the postage meter machine 1, an updatable allocation table in the memory 3 or in the clock/date module 9 is called in order to determine the minimum validity duration or the validity timespan, this being interpreted in step 126 by comparison to the date that is currently set, or that is stored in non-volatile fashion in the clock/date module 9.

After conducting the inquiry in step 127, and if the result of the inquiry is negative, meaning that no updating date are to be loaded, the normal mode 135 is reached and the postage meter machine is again in the slave status. The data can be overwritten or modified in step 209 with the input means of the postage meter machine 1 or other inputs can be actuated and displayed. An automatic print data input with protected data also ensues for preparing for the print-out, as was disclosed in greater detail in the aforementioned co-pending U.S. application Ser. No. 08/525,923. Following step 209, the point e is reached, i.e. the beginning of a communication mode 300, and an inquiry is made in step 301 to determine whether a transaction request is present. In a sub-step 310 the state of the communication mode 300 is displayed, including sub-steps to establish communication with the data center DZ, to conduct a transaction, to reload a balance due and other data, if a transaction request is present, by virtue of an affirmative answer to the inquiry in step 301. When this is not the case, the communication mode 300 is exited and the point f is reached, i.e. the operating mode 290. If relevant data were communicated in the communication mode, then a branch is made to the step 213 for data interpretation. A statistics and error evaluation is implemented in step 213 in order to acquire further current data that, after branching to the system routine 200, can likewise be called in step 201. If non-communication was bund in step 211, a branch is to be made to step 212.

A check is now made to determine whether corresponding inputs have been actuated in order to proceed (if the check is affirmative) into the test mode 216 given a test request 212, or into a display mode 215 given the desire for a register status check 214. If this is not the case, the point d, i.e., the franking mode 400, is automatically reached. A branch is then made from the franking mode 400 to point e when the piece count credit has been used and a communication with the data center DZ must be activated in order to be able to continue franking. A branch is made from the flanking mode 400 to the point f in order to enable a data entry with the postage meter machine keyboard in step 209 as long as a signal for a print output request was not yet generated. If, however, a piece of mail was recognized, the print output request was generated and a franking was implemented, then a branch is made back to point u.

As a result of the aforementioned branch-back, the check data communicated from the scab 2 to the postage meter machine 1 in step 123 can be evaluated before each and every franking in step 126 to determine whether an updating of the data stored in the scale 2 or in the postage meter machine 1 is required.

The normal mode 240 of the scale 2 is reached according to FIG. 3 when no mode switching on the part of the postage meter machine 1 has been signaled in the predetermined time interval. After an uneventful, duration-limited waiting of the scale 2 for a corresponding message in step 226, the end of the time interval is found in the inquiry step 227 and a branch is made to the normal mode 240 of the scale 2.

Figure 14:
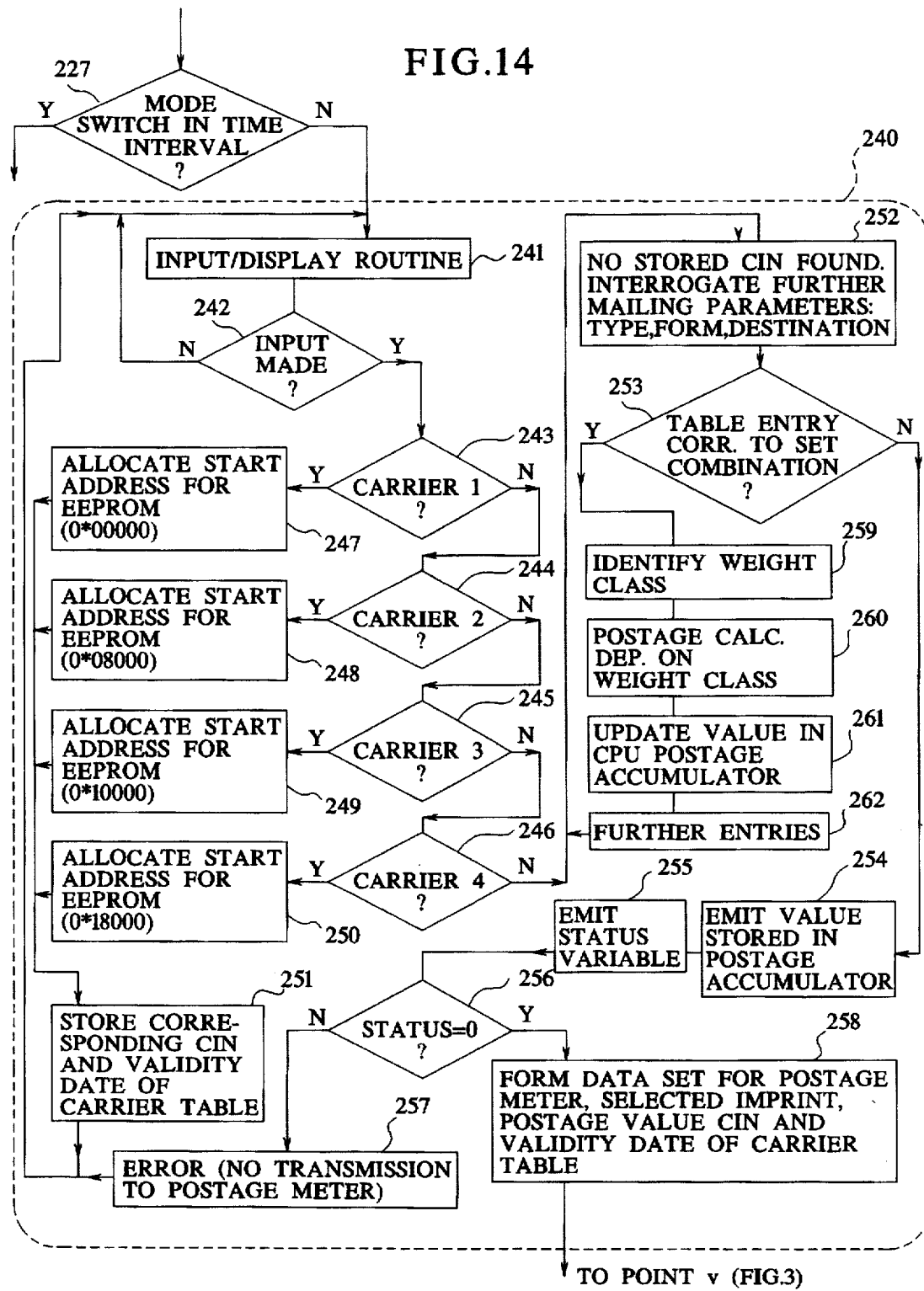
FIG. 14 is a flowchart for the scale in normal mode.

FIG. 14 shows a flowchart for the scale 2 in the normal mode 240 in more detailed form. The normal mode 240 has sub-steps 243–246 for an inquiry of a key actuation that was undertaken in sub-step 241. A finding is made in sub-step 242 as to whether a key input was actuated before a branch is made to step 243. Inventively, the interrogation of a predetermined key to which a specific postal carrier was allocated in step 221 during the initialization of the scale 2 ensues in sub-step 243, 244, 245 or 246. A corresponding allocation of a start address ensues in sub-steps 247–250 dependent on the actuation of a predetermined key. A selection possibility between four locally available postal carriers was created in the exemplary embodiment, however, an embodiment with only one locally available postal carrier can also be realized. In the latter instance, when them is no selection possibility, the inquiry steps 243–246 for the postal carriers allocated to the keys are eliminated. The scale 2 then operates according to the schedule of that postal carrier for whom the initialization ensues (allocation of a set to carriers). In sub-step 246, for example, a fourth carrier is found for whom the start address of the memory EEPROM is set in sub-step 250. Subsequently, a CIN is identified in sub-step 251 corresponding to a stored allocation to an actuated key before a branch is made back to sub-step 241 for the purpose of further inputs. On the other hand, if a carrier was not found in sub-steps 243–245 nor was a fourth carrier found in sub-step 246, a branch is made to sub-step 252 for the interpretation of further inquiries. The interpretation thereby ensues in view of the mailing parameters of type, form and destination. In the determination of the postage, the selective imprint to be transmitted is selected from the EEPROM on the basis of a key combination that has been set. If no suitable selected imprint is stored for the key combination that has been set, a selective imprint having the value 0 is transmitted in order to make it clear that no selective imprint is available.

Subsequently, an inquiry for table entries is implemented in sub-step 253. When a table entry corresponding to the combination that has been set is found, a branch is made to sub-step 259 to identify the weight class. The actual postage calculation ensues in the following sub-step 260, whereby the processor 27 is programmed as control means for calculating and, later, data transmission of the postage and/or for data communication of check data to the postage meter machine 1 as well as for mode switching by the memory 28. In accord with the postage calculation, the value in the postage accumulator of the CPU 27 is then updated in sub-step 261. Subsequently, a search for further data entries is made in sub-step 262 and a branch is made back to sub-step 252. Otherwise, when no further table entry corresponding to the combination that has been set is found, a branch is made to sub-step 254 in order to emit the intermediately stored value in the postage accumulator of the CPU 27. A corresponding status variable is emitted in the following sub-step 255. The status that has been reached is interrogated in the inquiry step 256 and is thereby interpreted such that a branch to the error output in sub-step 257 is made when the status is unequal to 0. In this case, no data transmission to the postage mater machine 1 ensues; rather, a branch is made back to the input routine in sub-step 241. Otherwise, given a status equal to 0, a branch is made to the sub-step 258 in order to compile a data set that is to be communicated to the postage meter machine 1. To this end, a branch is made back to point v in FIG. 3 in order to subsequently select the serial interface of the postage meter machine 1 in step 222 and to then start the data transmission to the postage meter machine 1 in step 223.

As noted above, the scale 2 has an I/O unit 26 connected to the processor 27 as well as an interface 25 connected to the I/O port 26 which is coupled via a connecting cable 24 to the interface means 22 of the postage meter machine 1.

In the method for data entry into the scale 2 of the mail processing system, whereby the scale 2 is connected to the postage meter machine 1 via interfaces 22 and 25, the following steps are executed:

Initialization (step 221) of the scale 2 after activation (step 226) of the scale 2;

Initialization (step 121) of the postage meter machine 1 after the activation (step 120) of the postage meter machine 1;

Mode selection for the mail processing system;

Selection (step 122 and step 222) of the respective interface of the postage meter machine 1 and of the scale 2 for preparing a data transmission;

Data transmission to the postage meter machine 1 and acknowledge of the ensued data transmission;

Switching the mode (steps 127 and 227) for the postage meter machine 1 and for the scale 2 into the updating mode when an updating requirement is identified; and Switching back (steps 127 and 227) into the normal operating mode (steps 136 and 240) when an updating requirement is no longer present.

The method is further characterized by a location-specific compiling of a list on the part of the data center DZ in order to undertake entry of the postal zip code into scale 2 in a first sub-step of the step 221 for initialization and by location-specific compiling of data for the scale 2 from an external source via a communication network. In one embodiment the scale 2 is activated by a user after a change in location and that the input of the postal zip code is undertaken with the scale keyboard 42 after the activation in the aforemention sub-step of the step 221 for the initialization of the scale 2.

In another embodiment, following a change in location, the scale 2 is activated by a user and the input of the postal zip code into the scale is automatically undertaken with a chip card 10 or with a mobile radio telephone or communication network after the activation via the postage meter machine 1 following a mode switch and a branch is then made back to step 221 of the initialization of the scale 2 in order to complete the initialization for the new location.

The scale 2 is correspondingly programmed that a communication requirement is formed and communicated to the postage meter machine 1 after the activation in a sub-step of the step initialization of the scale. A communication of the location can ensue from the local exchange within the framework of a service during a teletransmission of data.

Corresponding location information is communicated into the scale 2 by the postage meter machine 1 during the step 134. Controlled by the postage meter machine 1, data for the scale 2 and for the postage meter machine 1 are automatically stored.

The arrangement for data input into a mail processing system that contains a scale 2 and a postage meter machine 1 is based on a processor system of the postage meter machine 1 in order to load at least one table from a transmission means into a predetermined write/reed memory of the postage meter machine 1 via reception means. It is also inventively provided that the aforementioned means of the postage meter machine 1 store control data for the transmission to the scale 2 in the memory means of the postage meter machine 1, and that the control unit 5 is programmed to the switch the postage meter machine 1 into the normal mode after receipt of an ACK message sent by the scale 2 to the postage meter machine 1 and when no further data are to be read from the transmission means, or to switch the postage meter machine 1 into the standby mode when no mail is to be franked with a postage value.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for entering data into a scale of a mail processing system, said mail processing system also containing a postage meter machine, said method comprising the steps of:

providing a postage meter machine;

providing a modemless scale having means for manually entering data into said scale;

connecting said scale and said postage meter machine via a cable and respective interfaces, and allowing data entry into said scale exclusively by using said cable and said means for manually entering data;

initializing said postage meter machine and said scale for permitting said scale to execute routines for calculating postage, for communicating a postage amount to said postage meter machine via said cable in a normal mode, for communicating check data to the postage meter machine via said cable, and for mode switching;

automatically checking a most recent status of data content stored in said scale after activation of said scale and said postage meter machine by communication, via said cable, of said check data from said scale to said postage meter machine containing information regarding a data modification which is to become effective at a future validity date, and including transmitting said validity date;

compiling location-specific data at least for said scale from an external memory; and location-specific initializing said scale and data internally stored therein after a mode switching, and transmitting updated data via said cable from said postage meter machine to said scale from said external memory within a predetermined time window after activation of said scale.

2. A method as claimed in claim 1 wherein the step of compiling location-specific data at least for said scale comprises compiling location-specific window data including data for at least one of a postmark and auxiliary functions for said postage meter machine and including current information for a configuration at least of said scale by transmitting a portion of said window data via a first means for transmitting information and transmitting a further portion of said window data by a user-associated setting of said postage meter machine with a second means for transmitting data.

3. A method as claimed in claim 2 comprising the additional steps of employing a first chip card having a first memory with first fetchable data blocks as said first means for transmitting data, and employing a second chip card having a second memory with second fetchable data blocks as said second means for transmitting data.

4. A method for entering data into a scale of a mail processing system, said mail processing system also containing a postage meter machine, said method comprising the steps of:

providing a postage meter machine;

providing a modemless cable having means for manually entering data into said scale;

connecting said scale and said postage meter machine via a cable and respective interfaces, and allowing data entry into said scale exclusively by using said cable and said means for manually entering data;

connecting said scale and said postage meter machine via a cable and respective interfaces;

initializing said postage meter machine and said scale for permitting said scale to execute routines for calculating postage, for communicating a postage amount to said postage meter machine via said cable in a normal mode, for communicating check data to the postage meter machine via said cable, and for mode switching;

automatically checking a most recent status of data content stored in said scale after activation of said scale and said postage meter machine by communication, via said cable, of said check data from said scale to said postage meter machine containing information regarding a data modification which is to become effective at a future validity date, and including transmitting said validity date;

compiling location-specific data for said scale in a memory external to said scale by entering updating data into said external memory; and updating data internally stored in said scale after mode switching by transmitting said updating data via said cable from said postage meter machine to said scale.

5. A method as claimed in claim 4 comprising the step of compiling location-specific window data including at least one of postmark data and auxiliary functions for said postage meter machine and including current information for a configuration of said scale via a communication network containing a memory having fetchable data blocks containing at least one of said postmark data and said auxiliary functions and containing updating data for said scale.

6. A method for entering data into a scale of a mail processing system, said mail processing system also including a postage meter machine, said method comprising the steps of:

providing a postage meter machine;

providing a modemless scale having means for manually entering data into said scale;

interconnecting said scale and said postage meter machine by interfaces and a connecting cable, and allowing data entry into said scale exclusively by using said cable and said means for manually entering data;

activating said scale and subsequently initializing said scale;

activating said postage meter machine and subsequently initializing said postage meter machine;

selecting a mode for operating said scale and said postage meter machine among a plurality of modes including a normal operating mode and an updating mode;

in said normal operating mode, selecting an interface of said postage meter machine among a plurality of interfaces for preparing a data transmission;

transmitting data to said postage meter machine from a remote location including, if necessary, an updating requirement and acknowledging said data transmission from said postage meter machine to said remote location, said data, if said update requirement is present, including updated data for modifying existing data in at least one of said scale and postage meter machine;

switching the mode of said postage meter machine into said updating mode when said updating requirement is identified in said data transmission and transmitting said updated data to said scale from said postage meter machine via said cable if existing data in said scale require modification; and switching said postage meter machine back to said normal operating mode when said updating requirement is no longer present.

7. A method as claimed in claim 6 comprising the additional step of compiling a location-specific list at said remote location for entering a postal zip code into said scale during initializing of said scale and compiling location-specific data in said scale from an external memory via a communication network.

8. A method as claimed in claim 7, following a change in location and subsequent activation of said scale, entering a new postal zip code into said scale via said means for manually entering data into said scale, after activating said scale during initializing of said scale.

9. A method as claimed in claim 6, following a change in location of said scale, activating said scale and automatically entering a new postal zip code into said scale, after activation of said scale, via said cable from said postage meter machine and switching said mode into said updating mode and returning to initialization of said scale for completing initialization at the new location.

10. A method as claimed in claim 9 wherein the step of automatically entering said postal zip code into said scale comprises automatically entering said postal zip code into said scale via said cable from a data source in communication with said postage meter machine selected from the group consisting of a chip card, a mobile radio telephone and a communication network.

11. A method as claimed in claim 9 wherein, following activation of said scale, forming a communication requirement and communicating said communication requirement and subsequently communicating location information to said scale from said postage meter machine via said cable.

12. A method as claimed in claim 9 comprising the additional steps of communicating, from said postage meter machine a telephone number of a calling terminal at which said scale is located to a remote data center and interpreting said telephone number at said remote data center to identify a location of said scale.

13. A method as claimed in claim 6 comprising the additional step of compiling a further location-specific list at said remote location for entering a carrier identification number corresponding to a name of a postal carrier into said scale during initializing of said scale and compiling location-specific data for the scale from an external memory via a communication network.

14. A method as claimed in claim 13 comprising the additional steps of maintaining a set of selected mail carriers with one mail carrier being allocated to each location of said scale, and loading a current postage rate table via said cable into said scale as soon as said postage meter machine recognizes said updating requirement.

15. A method as claimed in claim 14 comprising the additional step of said postage meter machine automatically dialing said remote location when a minimum validity duration for rate schedule stored in said scale is transgressed when a different set of mail carriers is defined for said scale.

16. A method as claimed in claim 14 comprising the additional steps of storing an allocation of machine number, machine location and loaded carrier constellation for each postage meter machine at said remote location, and automatically changing a previous location and a previous carrier constellation upon entry of one of a new location or a new set of mail carriers.

17. A method for entering data into a scale of a mail processing system, said mail processing system also containing a postage meter machine, said method comprising the steps of:

providing a postage meter machine;

providing a modemless scale having means for manually entering data into said scale;

connecting said scale and said postage meter machine via a cable and respective interfaces, and allowing data entry into sad scale exclusively by using said cable and said means for manually entering data;

initializing said postage meter machine and said scale for permitting said scale to execute routines for calculating postage, for communicating a postage amount to said postage meter machine via said cable in a normal mode, for communicating check data to the postage meter machine via said cable, and for mode switching; and updating said data stored in said scale via said cable from said postage meter machine by transmitting updating data to said scale from said postage meter machine via said cable upon receipt of an updating instruction supplied from an external memory.

18. A method as claimed in claim 17 comprising the additional step of supplying said updating instruction to said postage meter machine from a chip card.

19. A method as claimed in claim 17 comprising the step of transmitting said updating instruction to said postage meter machine via a communication network.

20. In a mail processing system having a scale and a postage meter machine connected via a connecting cable and interfaces, the improvement comprising an apparatus for entering data into said mail processing system comprising:

said scale comprising a modemless scale having means for manually entering data into said scale, said cable and said means for manually entering data comprising an exclusive means for entering data into said scale;

transmission means for storing and transmitting into said postage meter machine said data;

a permanent memory in which programs for communicating with an external memory are contained;

a central processing unit in said postage meter machine;

reception means for communicating with said central processing unit for programming said central processing unit following initialization or activation of said postage meter machine in conformity with at least two predetermined conditions entered into said postage meter machine and stored therein, for loading updating data into a data storage unit of said postage meter machine;

said central processing unit comprising means for checking check data communicated from said scale to said postage meter machine via said cable to determine whether a mode switch into an updating mode is required;

said data storage unit containing the control data for controlling transmission of updating data from said postage meter machine to said scale via said cable;

a processor in said scale connected to security means for preventing unauthorized erasure of data in a memory in said scale, said processor in said scale comprising means for controlling operating software stored in said memory for location-specific initialization of said scale, for communicating calculating postage to said postage meter machine via said cable and for transmitting said check data to said postage meter machine via said cable and for switching said mode and for updating data in said memory.

21. The improvement of claim 20 wherein said central processing unit of said postage meter machine comprises means for identifying a reloading requirement on the basis of conditions stored in said data storage unit, and said means for transmitting said data comprising means for storing said data in fetchable data blocks in a memory.

22. The improvement of claim 20 wherein said means for transmitting said data comprises a chip card.

23. The improvement of claim 20 wherein said means for receiving comprises means for analyzing said at least two conditions in combination with said central processing unit.

24. The improvement of claim 20 wherein said central processing unit comprises means for identifying a postage rate table currently in force on the basis of a data request relating to dispatching country, location and date, said request data being loaded from said external memory and intermediately stored by said data storage unit, for automatically checking via said cable a most recent status of data stored in said scale on the basis of said check data communicated to the postage meter machine via said cable from the scale with regard to modification of a validity date of said data, for switching a mode in the event of a reloading requirement, for transmitting data sets stored in said postage meter machine to said scale via said cable for updating said data in said memory of said scale with a reloading routine within a predetermined time window following activation, and for storing new control data for transmitted subsequent updating data to said scale in said data storage unit.

25. The improvement of claim 20 wherein said scale comprises an I/O port connected to said processor and an interface connected to said cable to said I/O port, and said processor comprising means for controlling calculation and data communication of postage and check data to said postage meter machine via said cable and for mode switching on the basis of said memory in said scale.

26. The improvement of claim 20 comprising means in said postage meter machine for generating a signal at an end of data transmission and communicating said signal to said scale via said cable, and said processor in said scale comprising means for checking upon receipt of said signal and transmitting a corresponding handshake signal via said cable and for decompressing data transmitted to said scale after said transmission has ended and following initialization of said scale and switching of said scale to said normal mode.

27. The improvement of claim 20 wherein said central processing unit of said postage meter machine comprises means for switching said postage meter machine and said scale into a normal mode of operation after receipt of an acknowledgement signal transmitted from said scale to said postage meter machine via said cable when no further data are to be read from said means for transmitting data.

28. The improvement of claim 20 wherein said central processing unit of said postage meter machine comprises means for switching said postage meter machine and said scale into a standby mode of operation after receipt of an acknowledgement signal transmitted from said scale to said postage meter machine via said cable when no mail is to be franked with a postage value.

29. The improvement of claim 20 wherein said data storage unit comprises a write/read memory.

30. The improvement of claim 20 wherein said data storage unit comprises a clock/date module.

31. The improvement of claim 20 further comprising input/output means for organizing input and output of data and said postage meter machine further comprising a printer module, a keyboard and reception means for said means for transmitting data connected to said input/output means, said input/output means being connected to said central processing unit of said postage meter machine via a bus.

32. The improvement of claim 31 wherein said postage meter machine further comprises a display, said display being connected to said data storage unit via said bus for display of contents of said data storage unit.

* * * * *